(12) United States Patent
Hwang et al.

(10) Patent No.: US 7,848,464 B2
(45) Date of Patent: Dec. 7, 2010

(54) METHOD AND APPARATUS FOR RECEIVING DATA IN A COMMUNICATION SYSTEM

(75) Inventors: Keun-Chul Hwang, Seongnam-si (KR);
Soon-Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 907 days.

(21) Appl. No.: 11/716,385

(22) Filed: Mar. 9, 2007

(65) Prior Publication Data

US 2008/0025442 A1 Jan. 31, 2008

(30) Foreign Application Priority Data

Mar. 9, 2006 (KR) .................. 10-2006-0022229

(51) Int. Cl.
*H04L 27/06* (2006.01)

(52) U.S. Cl. .................. 375/341; 375/229; 375/254; 375/342; 375/343; 375/350; 455/121; 455/130

(58) Field of Classification Search .................. 375/130, 375/219, 220, 229, 250, 260, 267, 294, 295, 375/297, 299, 316, 327, 341, 343, 347, 342, 375/350; 370/201, 335, 342, 347, 270, 290
See application file for complete search history.

(56) References Cited

U.S. PATENT DOCUMENTS

| | | | | |
|---|---|---|---|---|
| 7,415,001 | B2* | 8/2008 | Naguleswaran et al. | 370/347 |
| 7,742,386 | B2* | 6/2010 | Jones et al. | 370/201 |
| 2004/0033791 | A1* | 2/2004 | Schmidl et al. | 455/137 |
| 2004/0038653 | A1* | 2/2004 | Claussen et al. | 455/130 |
| 2004/0165675 | A1* | 8/2004 | Ito et al. | 375/267 |
| 2005/0111592 | A1* | 5/2005 | Yee | 375/341 |
| 2005/0164658 | A1* | 7/2005 | Oh et al. | 455/121 |
| 2006/0029149 | A1* | 2/2006 | Kim et al. | 375/267 |
| 2007/0104150 | A1* | 5/2007 | Fernandez-Corbaton et al. | 370/335 |

FOREIGN PATENT DOCUMENTS

KR 1020050116995 12/2005

* cited by examiner

*Primary Examiner*—Shuwang Liu
*Assistant Examiner*—Hirdepal Singh
(74) *Attorney, Agent, or Firm*—The Farrell Law Firm, LLP

(57) ABSTRACT

A method and apparatus for receiving data in a communication system is disclosed. Receiving a first signal from a transmitter, a first canceller cancels from the received first signal a second signal desired to be received from the transmitter. A second canceller detects and cancels an interference signal from the second signal-canceled first signal. A calculator calculates a Log Likelihood Ratio (LLR) of the interference signal-canceled first signal.

20 Claims, 11 Drawing Sheets

METHOD AND APPARATUS FOR RECEIVING DATA IN A COMMUNICATION SYSTEM

PRIORITY

This application claims the benefit under 35 U.S.C. §119(a) of a Korean Patent Application filed in the Korean Intellectual Property Office on Mar. 9, 2006 and assigned Serial No. 2006-22229, the disclosure of which is incorporated herein by reference.

BACKGROUND OF THE INVENTION

1. Field of the Invention

The present invention relates generally to a communication system, and in particular, to a data reception method and apparatus for canceling interference signals in a communication system in which interference signals exist.

2. Description of the Related Art

In the next generation communication system, extensive research is being conducted in order to provide users with high-speed services having various Qualities of Service (QoS) levels. Particularly, in the next generation communication system, active research is being carried out in order to support high-speed services in order to guarantee mobility and QoS for a Broadband Wireless Access (BWA) communication system such as a Wireless Local Area Network (WLAN) system and a Wireless Metropolitan Area Network (WMAN) system. An Institute of Electrical and Electronics Engineers (IEEE) 802.16a/d standard based communication system and an IEEE 802.16e standard based communication system are the typical BWA communication systems.

The IEEE 802.16a/d communication system and the IEEE 802.16e communication system employ Orthogonal Frequency Division Multiplexing (OFDM)/Orthogonal Frequency Division Multiple Access (OFDMA) to support broadband transmission networks for physical channels of the WMAN system. The IEEE 802.16a/d communication system takes into account the state where a Subscriber Station (SS) is stationary, i.e. mobility of the SS is not considered at all, and a single-cell configuration. However, the IEEE 802.16e communication system takes into account mobility of the SS in the IEEE 802.16a communication system. Herein, the SS having mobility will be referred to as a "Mobile Station (MS)."

In the BWA communication system, because cells constituting the communication system share the limited resources, i.e. frequency resources, code resources, time slot resources, etc., interference may occur between the cells, especially between neighbor cells. The interference between neighbor cells is greater in a communication system using a frequency reuse factor=1. More specifically, the use of the frequency reuse factor=1 can increase efficiency of the frequency resources. In this case, however, an MS located in an interference area between neighbor cells, especially located in a cell boundary, suffers a considerable decrease in received Carrier-to-Interference and Noise Ratio (CINR) from a Base Station (BS) that manages its own cell (hereinafter referred to as a "serving BS"). In the communication system with frequency reuse factor=1, an MS located in the vicinity of the serving BS, may have no difficulty in performing communication with the serving BS due to the low interference levels. However, an MS located in the cell boundary may suffer a reduction in system performance, because it receives interferences from a BS managing neighbor cells (hereinafter referred to as a "neighbor BS").

In order to cancel the interference between neighbor cells, during downlink communication, the MS improves a received CINR from the serving BS using an interference canceller, and, during uplink communication, the serving BS improves a received CINR from the MS using an interference canceller, thereby improving the system performance. However, in the method of improving the system performance using the interference canceller, the interference canceller cannot correctly cancel interference signals, or cannot correctly restore signals received from the serving BS, failing to meet the expected improvement of the system performance.

FIG. 1 illustrates a configuration of a general IEEE 802.16e communication system.

Referring to FIG. 1, the communication system has a multi-cell configuration, i.e. has a cell #1 110 and a cell #2 120, and includes a BS #1 111 and a BS #2 121 that manage the cell #1 110 and a cell #2 120, respectively. An MS 113 that is located in the cell #1 110, receives a communication service from the BS #1 111. It will be assumed herein that signal exchange between the BSs 111 and 121 and the MS 113 is achieved through a first channel $h_1$ and a second channel $h_2$ using OFDM/OFDMA.

The MS 113 is located in the boundary of the cell #1 110, and the BS #1 111 transmits data to the MS 113 located in the cell #1 110 using an A-1 frequency region 151. The BS #2 121 that manages the cell #2 120 which is a neighbor cell of the MS 113, transmits data to MSs located in the cell #2 120 through a B-1 frequency region 161 and a B-2 frequency region 163. In this case, the MS 113 located in the boundary of the cell #1 110 may receive interference due to the data transmitted by the BS #2 121 which is a neighbor BS, while receiving data from the BS #1 111 which is a serving BS through the A-1 frequency region 151.

In other words, there is an overlapping region between the A-1 frequency region 151 allocated by the BS #1 111 to the MS 113, and the B-1 frequency region 161 and the B-2 frequency region 163 allocated by the BS #2 121 to MSs located in the cell #2 120. The overlapping region becomes an interference region for the MS 113 located in the boundary of the cell #1 110. Because of the interference region, if the BS #2 121 of the cell #2 120 transmits data through the B-1 frequency region 161 and the B-2 frequency region 163 using the same time-frequency resources as those of the BS #1 111, while the MS 113 is receiving data from the BS #1 111 through the A-1 frequency region 151, then the MS 113 located in the boundary of the cell #1 110 suffers a decrease in received CINR, causing a reduction in reception performance.

In order to prevent the reduction in the CINR due to the interference from the cell #2 120, the MS 113 cancels interference using an interference canceller as described above. However, because the BS #1 111 and the BS #2 121 allocate resources independently of each other, the interference canceller may not exactly cancel interference signals, or may not accurately restore signals received from the BS #1 111, which is a serving BS, thus failing to meet the expected improvement of the system performance.

More specifically, if the BS #2 121 of the cell #2 120 transmits data through the B-1 frequency region 161 and the B-2 frequency region 163, while the MS 113 is receiving data from the BS #1 111, which is a serving BS through the A-1 frequency region 151, then the MS 113, as the data transmitted by the BS #2 121 serves as interference thereto, requires information on the overlapping region, i.e. interference region, between A-1 frequency region 151 and the B-1 frequency region 161 and B-2 frequency region 163, in order to properly cancel the interference. In addition, the MS 113 requires information on a Modulation and Coding Scheme (MCS) level of the data transmitted through the B-1 frequency region 161, and an MCS level of the data transmitted through the B-2 frequency region 163, and further requires information on the channel $h_2$ of the cell #2 120.

In order to cancel neighbor cell interference of the cell #2 120, the MS 113 needs to estimate the channel of the cell #2 120 using MAP information of the BS #2 121 and pilots received from the BS #2 121. Accordingly, in order to cancel the neighbor cell interference, the MS 113 needs to acquire the above information, thus increasing its load and reducing the system performance. The reduction in the system performance is more considerable especially when the MS 113 has multiple neighbor cells.

FIG. 2 illustrates an operation of canceling interference signals by an MS in a general IEEE 802.16e communication system.

Referring to FIG. 2, the MS detects in step 201 an interference signal from a reception signal received via a reception antenna. Thereafter, the MS regenerates the detected interference signal in step 203, and cancels the interference signal in step 205. In step 207, the MS calculates a Log Likelihood Ratio (LLR) of the interference signal-canceled reception signal (i.e. the reception signal from which the interference signal is canceled), and delivers the LLR to a decoder.

Because such an interference cancellation scheme cancels an interference signal from a reception signal and then calculates an LLR of the interference signal-canceled reception signal, this scheme shows high performance in an area with high interference power, for example, in a low-CINR area, but shows low performance in an area with low interference power, for example, in a high-CINR area.

In addition, the key issue in communication is to transmit data through a channel efficiently and reliably. As the next generation multimedia communication system, which is now under active research, requires a high-speed communication system that can process and transmit various information such as image, radio data and the like, beyond the early voice-oriented service, it is necessary to increase the system efficiency by employing a channel coding scheme suitable to the system.

In the communication system, the wireless channel environment, unlike the wired channel environment, suffers from inevitable errors due to several factors such as multipath interference, shadowing, wave attenuation, time-varying noise, interference, fading, and the like, thereby causing information loss. The information loss causes considerable distortion of the actual transmission signals, reducing the entire performance of the communication system. Generally, in order to reduce the information loss, various error control techniques are used according to channel characteristic to increase the system reliability. One of the error control techniques uses error correction codes.

In order to prevent unstable communication due to the fading, a diversity technique is used, and the diversity technique is roughly classified into a time diversity technique, a frequency diversity technique, and an antenna diversity technique, i.e. spatial diversity technique.

The antenna diversity technique, a diversity technique using multiple antennas, is classified into a reception antenna diversity technique using multiple reception antennas, a transmission antenna diversity technique using multiple transmission antennas, and a Multiple Input Multiple Output (MIMO) technique using multiple reception antennas and multiple transmission antennas.

In the MIMO-based communication system, the data to be transmitted via each of the transmission antennas is determined by Space-Time Coding (STC), and each of the reception antennas receives the signal transmitted from its associated transmission antenna and performs STC decoding on the received signal. The STC coding is implemented with a space-time transmission diversity technique for encoding the same data in different formats to transmit the data via different transmission antennas, or a spatial multiplexing technique for transmitting different data via different transmission antennas.

Generally, in the spatial multiplexing technique, an STC-coded signal is decoded in a receiver using a joint or separate detection scheme. The joint detection scheme should take into account not only the signal transmitted from one transmission antenna, but also the signals transmitted from the other transmission antennas, which serve as interference signals. Because of such characteristics, a maximum likelihood decoding technique is known as an optional decoding algorithm for using the spatial multiplexing MIMO-based communication system. The use of the maximum likelihood decoding technique can obtain a number of equal diversity orders equal to the number of reception antennas, regardless of the number of transmission antennas. Therefore, the maximum likelihood decoding technique, compared with the other decoding techniques, shows high performance in terms of a Signal-to-Noise Ratio (SNR), and its SNR gain increases with the number of transmission antennas. However, as the number of transmission antennas increases, the maximum likelihood decoding technique exponentially increases in complexity of the communication system.

SUMMARY OF THE INVENTION

An aspect of the present invention is to address at least the problems and/or disadvantages and to provide at least the advantages described below. Accordingly, an aspect of the present invention is to provide a method and system for receiving data in a communication system.

Another aspect of the present invention is to provide a data reception method and system for improving reception performance in a communication system in which interference signals exist.

According to one aspect of the present invention, there is provided a method for receiving data in a communication system. The method includes, receiving a first signal from a transmitter, canceling from the received first signal a second signal desired to be received from the transmitter; and detecting and canceling an interference signal from the second signal-canceled first signal, calculating a Log Likelihood Ratio (LLR) of the interference signal-canceled first signal, and decoding the LLR.

According to another aspect of the present invention, there is provided an apparatus for receiving data in a communication system. The apparatus includes a first canceller for, receiving a first signal from a transmitter, canceling from the received first signal a second signal desired to be received from the transmitter; a second canceller for detecting and canceling an interference signal from the second signal-canceled first signal; and a calculator for calculating a Log Likelihood Ratio (LLR) of the interference signal-canceled first signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The present invention provides a method and system for receiving data in a communication system, for example, an Institute of Electrical and Electronics Engineers (IEEE) 802.16 standard based communication system, which can be a Broadband Wireless Access (BWA) communication system. Although the present invention will be described herein with reference to an IEEE 802.16 communication system employing Orthogonal Frequency Division Multiplexing (OFDM)/Orthogonal Frequency Division Multiple Access (OFDMA), by way of example, the data reception method and system proposed by the present invention can also be applied to other communication systems.

In addition, the present invention provides a data reception method and system between a transmitter, for example, a Base Station (BS), and a receiver, for example, a Mobile Station (MS) for receiving a communication service from the transmitter, in a communication system where interference signals exist. The present invention provides a receiver employing a maximum likelihood decoding algorithm to improve reception performance of a receiver for receiving signals transmitted from multiple transmission antennas in a communication system employing a Multiple Input Multiple Output (MIMO) scheme using multiple reception antennas and multiple transmission antennas, and also provides a data reception method and apparatus for canceling interference signals from a reception signal received via the receiver to reduce complexity of the maximum likelihood decoding algorithm.

Moreover, the present invention provides a data reception method and apparatus in which, if a transmitter transmits data to provide a communication service to a receiver, the receiver receives a first signal via a reception antenna, cancels from the received first signal a second signal including a desired communication service, i.e. desired data, to be provided from the transmitter, calculates a Log Likelihood Ratio (LLR) by canceling an interference signal from the second signal-canceled first signal (i.e. the first signal from which the second signal is canceled), and delivers the LLR to a decoder, thereby improving its reception performance and reducing the system complexity.

Figure 1:
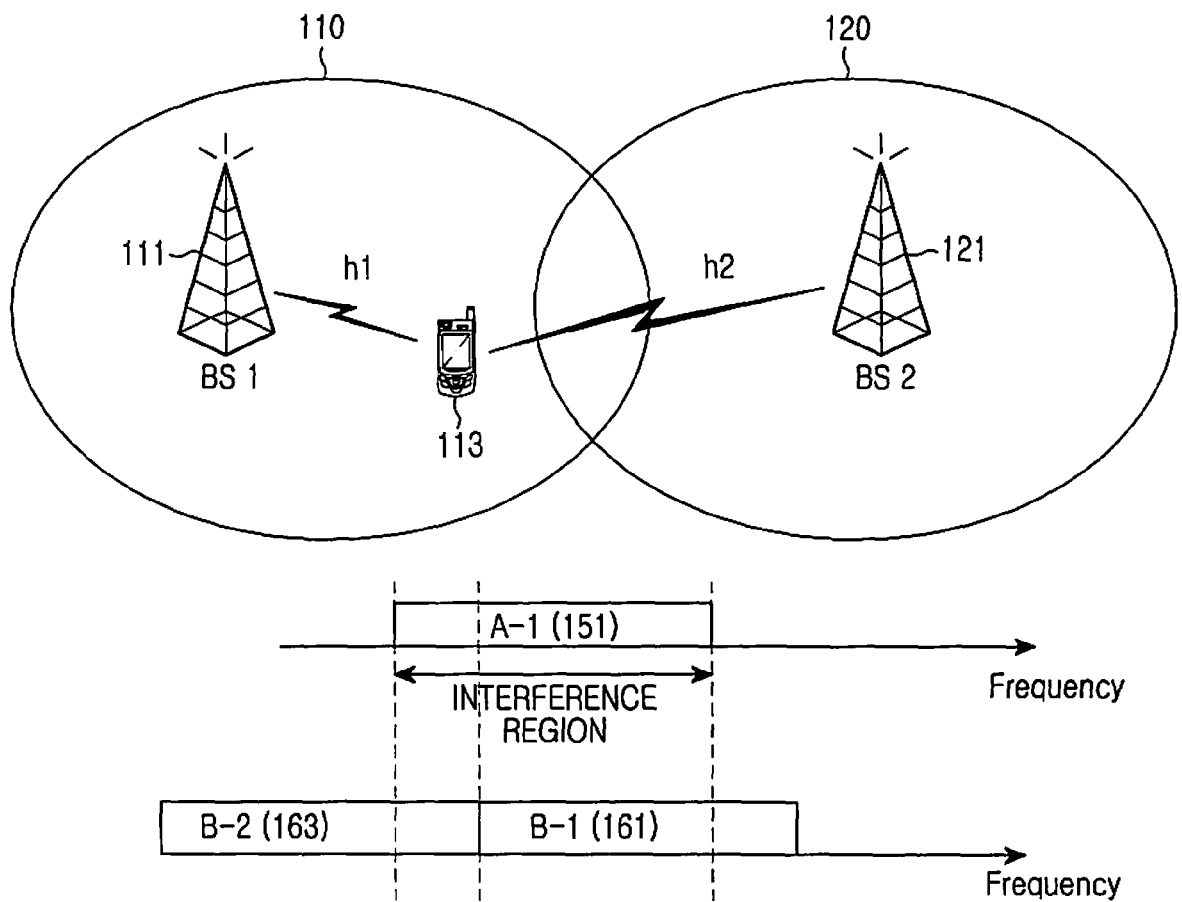
FIG. 1 is a diagram illustrating a configuration of a general IEEE 802.16e communication system.
Figure 2:
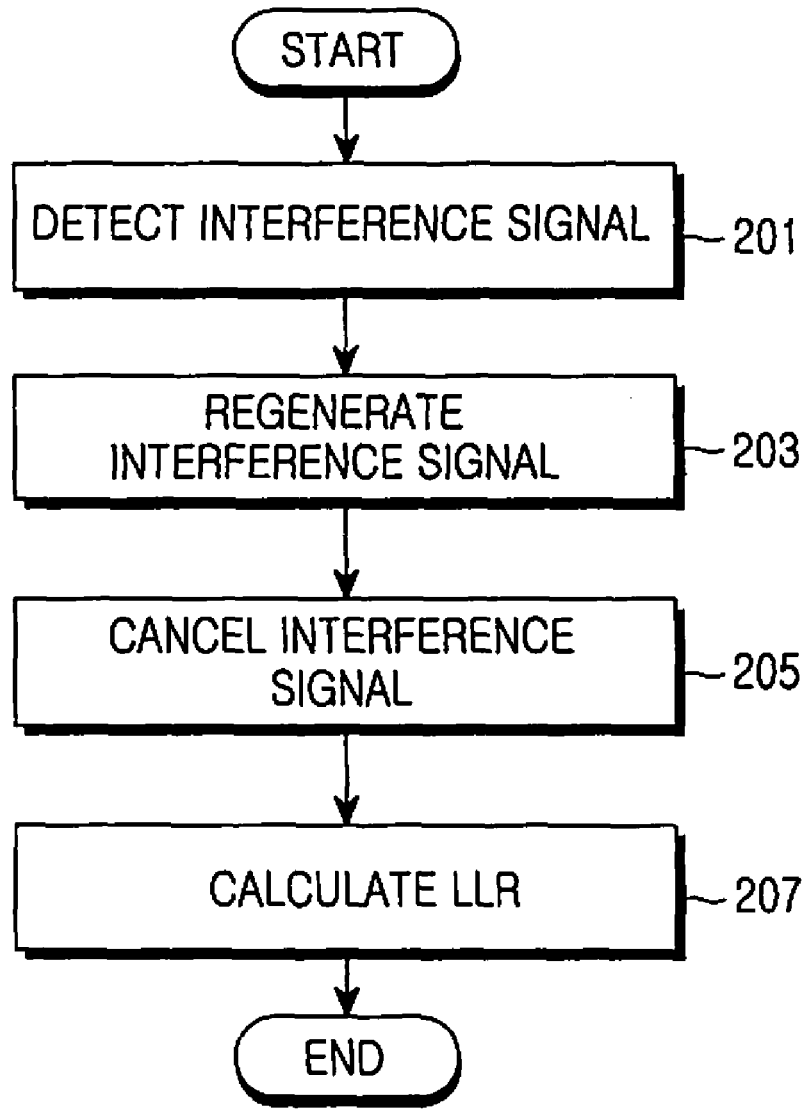
FIG. 2 is a diagram illustrating an operation of canceling interference signals by an MS in a general IEEE 802.16e communication system.
Figure 3:
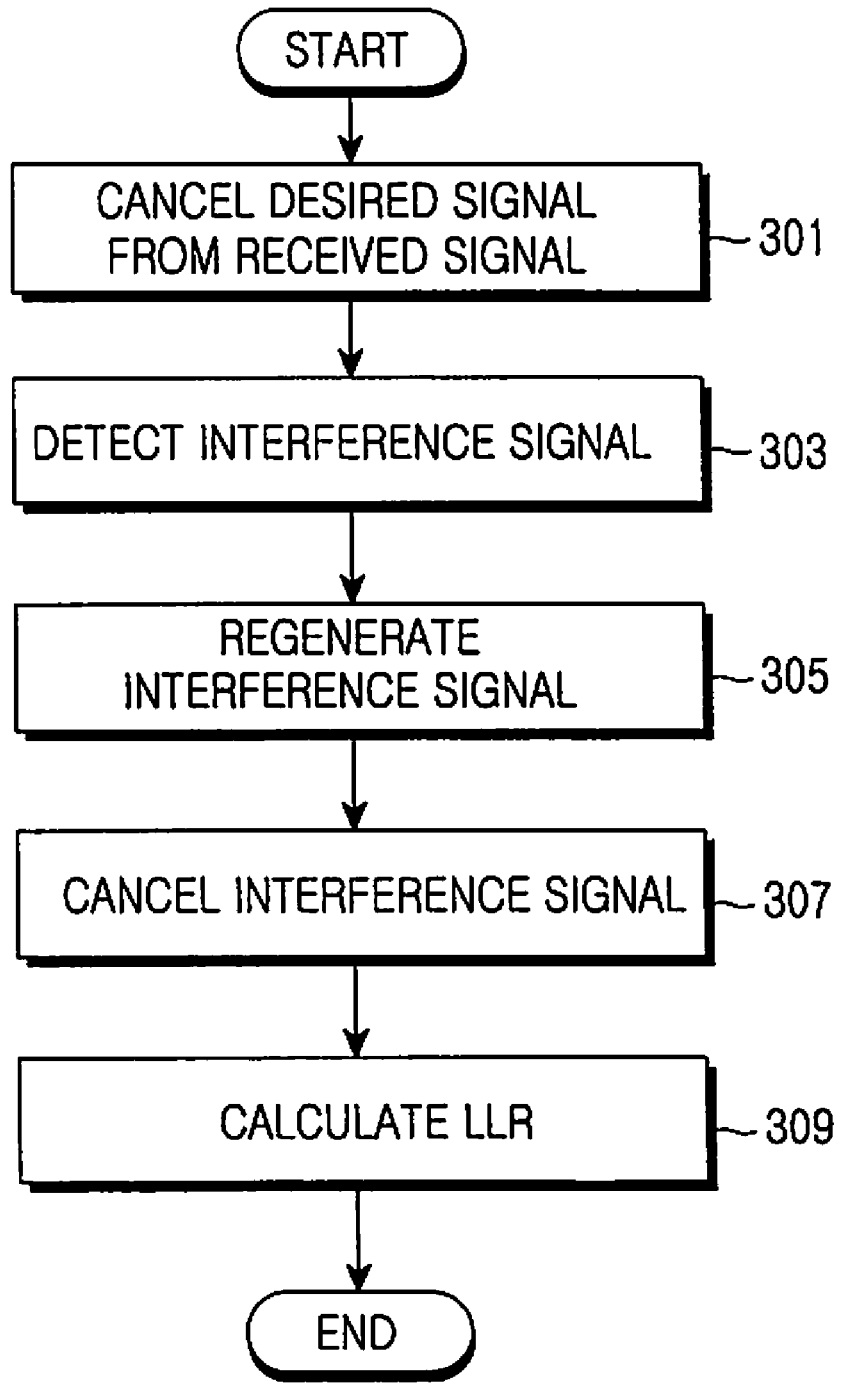
FIG. 3 is a diagram illustrating an operation of a receiver in a communication system according to the present invention.

FIG. 3 illustrates an operation of a receiver in a communication system according to the present invention.

Referring to FIG. 3, the receiver cancels in step 301 a desired signal from a reception signal received via a reception antenna, i.e. cancels the data transmitted by a transmitted as a desired signal to be received from the transmitter, from the reception signal received via the reception antenna. Herein, the reception signal refers to all signals received via one or more than one reception antennas. The reception signal can include not only the signal transmitted by a transmitter that desires to exchange data with the receiver itself, but also noises caused by various factors such as multipath interference, shadowing, wave attenuation, time-varying noise, interference, fading, and the like, all of which are subject to change according to the channel environment, especially to the wireless channel environment. In addition, the reception signal may include signals transmitted by all transmitters except for the transmitter that exchanges data with the receiver itself.

The receiver detects in step 303 an interference signal from the desired signal-canceled reception signal (i.e. the reception signal from which the desired signal is canceled). The interference signal is a signal that a transmitter located in a neighbor cell, for example, a neighbor BS managing a neighbor cell, in a communication system having a multi-cell configuration, has transmitted to a receiver located in the neighbor cell, for example, a neighbor MS, or a signal that a transmitter of a current cell where the receiver is located, for example, a serving BS managing the current cell, has transmitted to other receivers located in the current cell. The interference signal, as described above, includes the signals transmitted by all transmitters except for the transmitter that exchanges data with the receiver itself.

After detecting the interference signal from the desired signal-canceled reception signal, the receiver regenerates the detected interference signal in step 305, and cancels the regenerated interference signal in step 307. Thereafter, in step 309, the receiver calculates an LLR of the interference signal-canceled reception signal and delivers the LLR to a decoder.

With respect to the process of calculating an LLR and delivering it to a decoder, in a communication system, a transmitter encodes desired transmission data and transmits it to a receiver, and the receiver receiving the coded data calculates an LLR corresponding to reliability of the signal transmitted by the transmitter and delivers the LLR to a decoder in order to increase decoding performance of the coded data.

The LLR can be expressed as shown in Equation (1).

$$LLR(b_i) = \log \left\{ \frac{\sum_{c \in C_i^+} \sum_{\{c_k \in C | k=\ldots,K\}} \exp\left(-\left|r - \tilde{h}^{(desired)}c - \sum_{k=1}^{K} \tilde{h}_k^{(interferer)} c_k\right|^2 / 2N_0\right)}{\sum_{c \in C_i^-} \sum_{\{c_k \in C | k=1,\ldots,K\}} \exp\left(-\left|r - \tilde{h}^{(desired)}c - \sum_{k=1}^{K} \tilde{h}_k^{(interferer)} c_k\right|^2 / 2N_0\right)} \right\} \quad (1)$$

In Equation (1), $LLR(b_i)$ denotes an LLR of an $i^{th}$ bit, $C_i^+$ denotes a set of points with $i^{th}$ bit='+1' among constellation points, and $C_i^-$ denotes a set of points with $i^{th}$ bit='−1' among the constellation points. In addition, C denotes a set of all constellation points, r denotes a reception signal received via a reception antenna of a receiver, $\tilde{h}^{(desired)}$ denotes a signal that the receiver desires to receive in the reception signal, i.e. denotes a desired signal, and $\tilde{h}^{(interferer)}$ denotes an interference signal included in the reception signal. In addition, $$\left| r - \tilde{h}^{(desired)} c - \sum_{k=1}^{K} \tilde{h}_k^{(intrferer)} c_k \right|^2$$

denotes reception signal power after canceling, from the reception signal r, desired signals $\tilde{h}^{(desired)}$ in all constellation points and K interference signals $\tilde{h}^{(interferer)}$ in all constellation points, and $N_0$ denotes power of noises included in the reception signal.

Because the interference signal $\tilde{h}^{(interferer)}$, as described above, includes the signals transmitted by all transmitters except for the transmitter that exchanges data with the receiver itself, if the total number of transmitters, less the transmitter that exchanges data with the receiver itself, is K, the interference signal $\tilde{h}^{(interferer)}$ can include K interference signals. Therefore, in order to calculate an LLR of an $i^{th}$ bit using Equation (1), the receiver should calculate a Euclidian distance in a constellation for all signal combinations of the K interference signals. More specifically, if a modulation order is assumed to be M, because the number of constellation points is M, the receiver should calculate Euclidian distances for all of $M^{(K+1)}$ signal combinations. Therefore, an increase in the number of interference signals, i.e. the number of all transmitters except for the transmitter that exchanges data with the receiver itself, causes an exponential increase in complexity of the LLR calculation. In order to solve the problem that the increase in the number of interference signals causes the exponential increase in complexity of the LLR calculation, i.e. system complexity, the present invention expresses the LLR as shown in Equation (2).

$$LLR(b_i) = \log \left( \frac{\sum_{c \in C_i^+} \exp\left(-\left| r - \tilde{h}^{(desired)} c - \sum_{k=1}^{K} \tilde{h}_k^{(interferer)} \hat{x}_k(c) \right|^2 / 2N_0 \right)}{\sum_{c \in C_i^-} \exp\left(-\left| r - \tilde{h}^{(desired)} c - \sum_{k=1}^{K} \tilde{h}_k^{(interferer)} \hat{x}_k(c) \right|^2 / 2N_0 \right)} \right) \quad (2)$$

Similarly, in Equation (2), $LLR(b_i)$ denotes an LLR of an $i^{th}$ bit, $C_i^+$ denotes a set of points with $i^{th}$ bit='+1' among constellation points, and $C_i^-$ denotes a set of points with $i^{th}$ bit='-1' among the constellation points. In addition, C denotes a set of all constellation points, r denotes a reception signal received via a reception antenna of a receiver, $\tilde{h}^{(desired)}$ denotes a signal that the receiver desires to receive in the reception signal, i.e. denotes a desired signal, and $\tilde{h}^{(interferer)}$ denotes an interference signal included in the reception signal. In addition, $\hat{x}_k(c)$ denotes an estimated value of a $k^{th}$ interference signal when the desired signal $\tilde{h}^{(desired)}$ is transmitted through a constellation point c, $$\left| r - \tilde{h}^{(desired)} c - \sum_{k=1}^{K} \tilde{h}_k^{(interferer)} \hat{x}_k(c) \right|^2$$

denotes reception signal power after canceling, from the reception signal r, desired signals $\tilde{h}^{(desired)}$ in all constellation points, K interference signals $\tilde{h}^{(interferer)}$ and estimated values of the interference signals, and $N_0$ denotes power of noises included in the reception signal.

As shown in Equation (2), the present invention, instead of calculating Euclidian distances in the constellation for all signal combinations of K interference signals, cancels the desired signal $\tilde{h}^{(desired)}$ and then uses estimated values of the interference signals, thereby reducing complexity of the LLR calculation.

Figure 4:
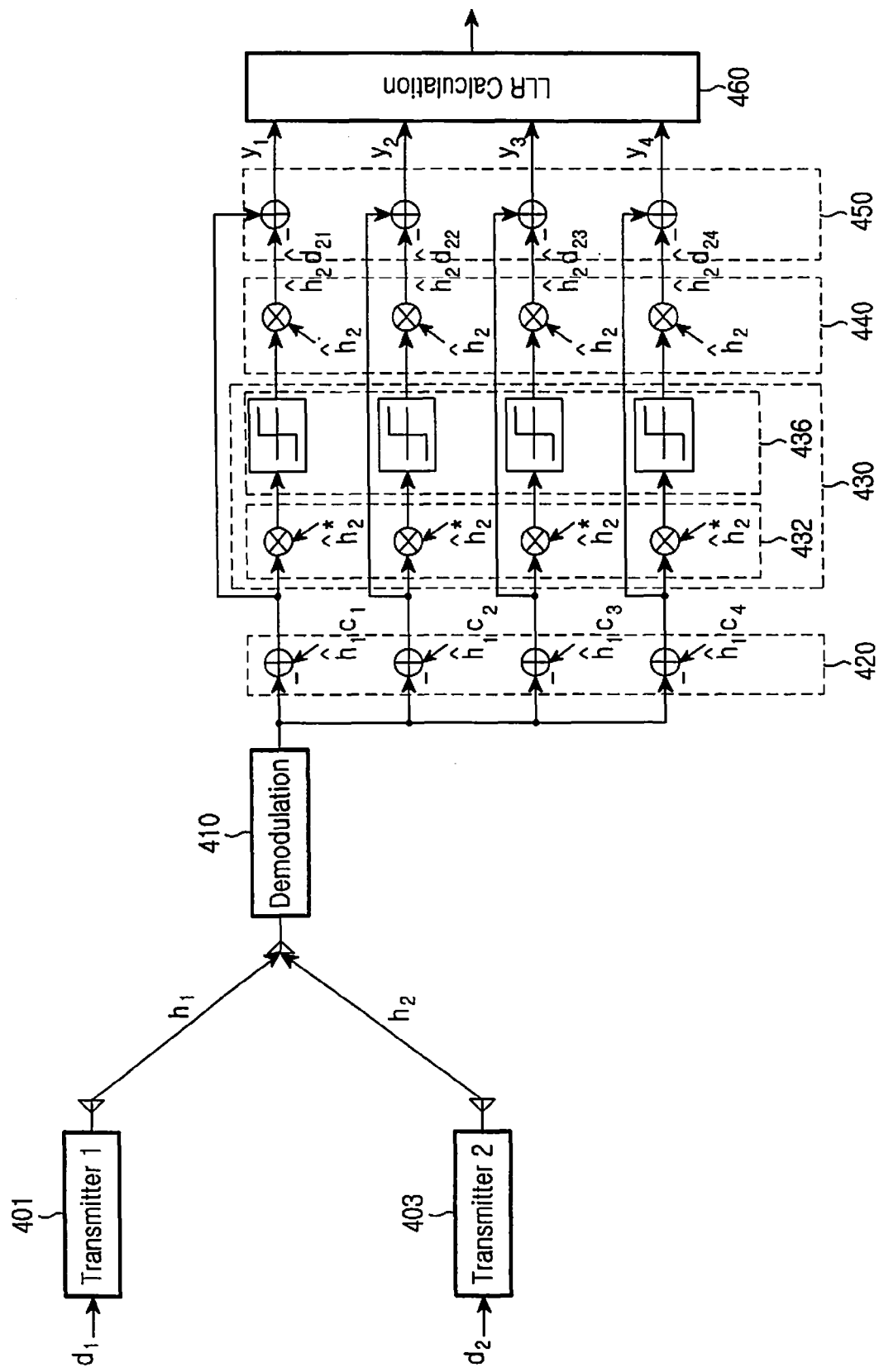
FIG. 4 is a diagram illustrating a structure of a receiver in a communication system according to the present invention.

FIG. 4 illustrates a structure of a receiver in a communication system according to the present invention. The receiver structure shown in FIG. 4 is provided when a receiver receives signals transmitted by two transmitters via one reception antenna, i.e. the number of interference signals is 1.

Referring to FIG. 4, the receiver includes a demodulator 410 for demodulating a signal received via a reception antenna using a scheme corresponding to a modulation scheme of a transmitter, a first canceller 420 for canceling, from the demodulated signal, a desired signal that the receiver desires to receive, a detector 430 for detecting an interference signal from the desired signal-canceled signal, a regenerator 440 for regenerating the detected interference signal, a second canceller 450 for canceling the regenerated interference signal from the desired signal-canceled signal, and a calculator 460 for calculating an LLR of the interference signal-canceled signal.

The receiver receives, via a reception antenna, signals that two transmitters, i.e. a transmitter #1 401 and a transmitter #2 403, have transmitted through wireless channels $h_1$ and $h_2$, and the received signals are delivered to the demodulator 410. It will be assumed herein that the transmitter #1 401 is a transmitter that exchanges data with the receiver, i.e. a transmitter that transmits a desired signal, and the transmitter #2 403 is a transmitter that transmits a signal serving as interference to the receiver, i.e. a transmitter that transmits an interference signal. In addition, it will be assumed that a modulation scheme of the transmitters 401 and 403, especially a modulation scheme of the transmitter #1 401, is Quadrature Phase Shift Keying (QPSK). The demodulator 410, receiving a reception signal from the reception antenna, demodulates the reception signal using a demodulation scheme corresponding to the modulation scheme, i.e. QPSK, of the transmitter #1 401 that exchanges data with the receiver itself.

The first canceller 420 includes four adders, and the four adders have a structure for canceling a desired signal taking into account all possible cases of the desired signal for the QPSK modulation scheme of the transmitter to cancel the desired signal from the demodulated reception signal. Because it is assumed that the modulation scheme of the transmitter is QPSK, the modulation scheme has four constellation points $c_1$, $c_2$, $c_3$ and $c_4$, thus the number of all possible cases of the desired signal is 4, and the four adders have a structure for canceling the desired signal taking the four cases into account.

More specifically, in the first canceller 420, the four adders have a branch structure taking into account the four possible cases of the desired signal, and the first canceller 420 cancels the desired signal from the demodulated reception signal by adding, to the adders, an estimated value $\tilde{h}_1$ of a channel $h_1$ over which the desired signal is transmitted in the four constellation points $c_1$, $c_2$, $c_3$ and $c_4$. That is, if the four adders equally receive the demodulated reception signal from the demodulator 410 and receive their associated channel estimated values $\tilde{h}_1 c_1$, $\tilde{h}_1 c_2$, $\tilde{h}_1 c_3$ and $\tilde{h}_1 c_4$, the four adders cancel the desired signal by subtracting the channel estimated values $\hat{h}_1c_1$, $\hat{h}_1c_2$, $\hat{h}_1c_3$ and $\hat{h}_1c_4$ from the demodulated reception signals. The desired signal-canceled reception signals are delivered to the detector 430.

The detector 430 includes an amplifier 432 and a signal decider 436, and the amplifier 432 includes four multipliers. The four multipliers are connected to their associated adders of the first canceller 420 to receive outputs signals of their associated adders. If the multipliers receive desired signal-canceled reception signals from their associated adders of the first canceller 420 and receive a conjugate value $\hat{h}^*_2$ of an estimated value $\hat{h}_2$ of a channel $h_2$ over which the interference signal is transmitted, the multipliers amplify the interference signal in the desired signal-canceled reception signals by multiplying the reception signals by the conjugate value $\hat{h}^*_2$ of the channel estimated value $\hat{h}_2$. The interference signal amplified in the desired signal-canceled reception signal is delivered to the signal decider 436, and the signal decider 436 detects the amplified interference signal from the reception signal, and delivers it to the regenerator 440. The signal decider 436 has a structure in which its four deciders are connected to their associated multiplier of the amplifier 432.

The regenerator 440 includes four multipliers, and the four multipliers are connected to their associated decider in the signal decider 436 of the detector 430 to receive output signals of their associated decider in the signal decider 436. If the multipliers receive their associated interference signal-detected reception signals (i.e. the reception signals from which the interference signal is detected) from the detector 430 and receive an estimated value $\hat{h}_2$ of a channel $h_2$ over which the interference signal is transmitted, the multipliers each regenerate an interference signal by multiplying the interference signal-detected reception signals by the channel estimated value $\hat{h}_2$. The regenerated interference signals $\hat{h}_2\tilde{d}_{21}$, $\hat{h}_2\tilde{d}_{22}$, $\hat{h}_2\tilde{d}_{23}$ and $\hat{h}_2\tilde{d}_{24}$ output from the four multipliers are delivered to the second canceller 450. Herein, $\tilde{d}_{21}$, $\tilde{d}_{22}$, $\tilde{d}_{23}$ and $\tilde{d}_{24}$ are estimated values of the interference signals, obtained when the desired signal is transmitted in the constellation points $c_1$, $c_2$, $c_3$ and $c_4$.

The second canceller 450 includes four adders, and the four adders receive signals $\hat{h}_2\tilde{d}_{21}$, $\hat{h}_2\tilde{d}_{22}$, $\hat{h}_2\tilde{d}_{23}$ and $\hat{h}_2\tilde{d}_{24}$ output from their associated multiplier of the regenerator 440 to cancel interference signals from the interference signal-regenerated reception signals (i.e. the reception signals in which the interference signal is regenerated). In addition, the four adders receive the desired signal-canceled reception signals output from their associated adder of the first canceller 420. If the four adders receive their associated interference signal-regenerated reception signals $\hat{h}_2\tilde{d}_{21}$, $\hat{h}_2\tilde{d}_{22}$, $\hat{h}_2\tilde{d}_{23}$ and $\hat{h}_2\tilde{d}_{24}$, and desired signal-canceled reception signals, the four adders each cancel the interference signal by subtracting the desired signal-canceled reception signals from the interference signal-regenerated reception signals. The reception signals from which the interference signal and the desired signal are canceled, i.e. output signals $y_1$, $y_2$, $y_3$ and $y_4$ of the four adders of the second canceller 450, are delivered to the calculator 460. Then the calculator 460 calculates LLRs of the reception signals from which the interference signal and the desired signal are canceled, using Equation (2), and delivers the LLRs to a decoder (not shown). A structure and LLR calculation of the calculator 460 will be described in detail hereinbelow.

Figure 5:
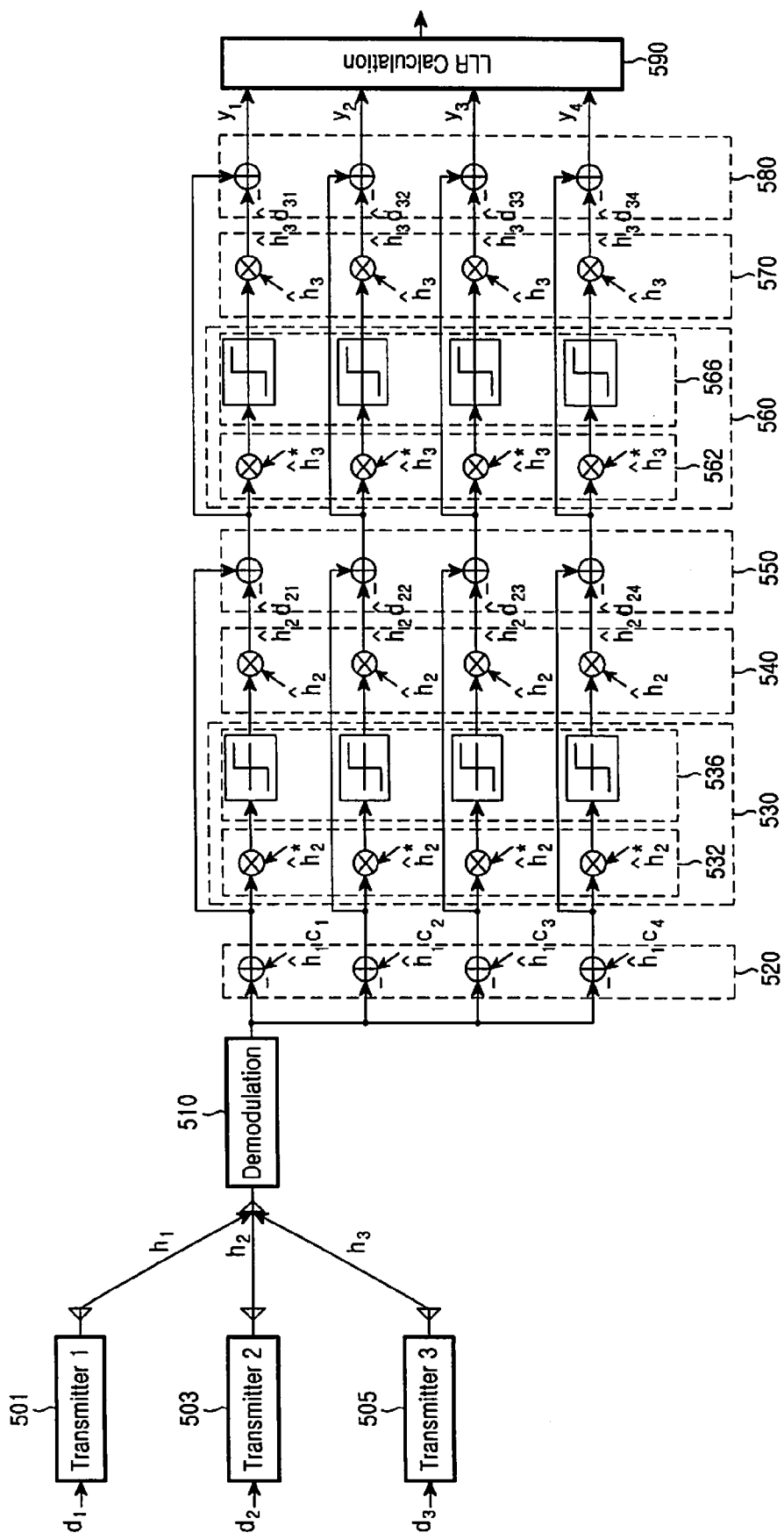
FIG. 5 is a diagram illustrating a structure of a receiver in a communication system according to the present invention.

FIG. 5 illustrates a structure of a receiver in a communication system according to the present invention. The receiver structure shown in FIG. 5 is provided for the case where a receiver receives signals transmitted by three transmitters via one reception antenna, i.e. the number of interference signals is 2. Before a description of FIG. 5 is given, it should be noted that the receiver structure of FIG. 4, in which the number of interference signals is 1, demodulates a reception signal received via a reception antenna, detects one interference signal by canceling a desired signal from the demodulated reception signal, regenerates the detected interference signal, cancels the regenerated signal, and then calculates an LLR.

The receiver structure shown in FIG. 5, in which the number of interference signals is 2, twice repeats the operation described with reference to FIG. 4. That is, the receiver demodulates a reception signal received via a reception antenna, cancels a desired signal from the demodulated reception signal, detects one of two interference signals from the desired signal-canceled reception signal, regenerates the detected interference signal, and then cancels the one interference signal. Thereafter, the receiver detects the other one interference signal, regenerates the detected interference signal, and cancels the regenerated interference signal. After canceling both of the two interference signals, the receiver calculates an LLR. As to interference signal cancellation priority for the two interference signals, i.e. a first interference signal and a second interference signal, an interference signal with a higher Signal-to-Interference and Noise Ratio (SINR) among the two interference signals can be canceled first. In this manner, interference cancellation performance can be improved. When the number of interference signals received via the reception antenna is greater than one, the receiver first detects a higher-SINR interference signal among the interference signals and cancels the detected interference signal. A detailed description thereof will now be made with reference to FIG. 5.

Referring to FIG. 5, the receiver includes a demodulator 510 for demodulating a signal received via a reception antenna using a scheme corresponding to a modulation scheme of a transmitter, a first canceller 520 for canceling, from the demodulated signal, a desired signal that the receiver desires to receive, a first detector 530 for detecting a first interference signal among two interference signals from the desired signal-canceled signal, a first regenerator 540 for regenerating the detected first interference signal, a second canceller 550 for canceling the regenerated first interference signal from the desired signal-canceled signal, a second detector 560 for detecting the other second interference signal among the two interference signals from the first interference signal-canceled signal (i.e. the signal from which the first interference signal is cancelled), a second regenerator 570 for regenerating the detected second interference signal, a third canceller 580 for canceling the regenerated second interference signal from the first interference signal-canceled signal, and a calculator 590 for calculating an LLR of the second interference signal-canceled signal.

The receiver receives the signals transmitted by three transmitters, i.e. a transmitter #1 501, a transmitter #2 503 and a transmitter #3 505 through wireless channels $h_1$, $h_2$ and $h_3$, via a reception antenna, and the received signals are delivered to the demodulator 510. It will be assumed herein that the transmitter #1 501 is a transmitter that exchanges data with the receiver, i.e. a transmitter that transmits a desired signal, and the transmitter #2 503 and the transmitter #3 505 are transmitters that transmit signals serving as interference to the receiver, i.e. transmitters that transmit interference signals. In addition, it will be assumed that a modulation scheme of the transmitters 501, 503 and 505, particularly a modulation scheme of the transmitter #1 501, is QPSK. The demodulator 510, receiving a reception signal from the reception antenna, demodulates the reception signal using a demodulation scheme corresponding to the modulation scheme, i.e. QPSK, of the transmitter #1 501 that exchanges data with the receiver itself.

The first canceller 520 includes four adders, and the four adders have a structure for canceling a desired signal taking into account all possible cases of the desired signal for the QPSK modulation scheme of the transmitter to cancel the desired signal from the demodulated reception signal. Because it is assumed that the modulation scheme of the transmitter is QPSK, the modulation scheme has four constellation points $c_1$, $c_2$, $c_3$ and $c_4$, thus the number of all possible cases of the desired signal is 4, and the four adders have a structure for canceling the desired signal taking the four cases into account.

More specifically, in the first canceller 520, the four adders have a branch structure taking into account the four possible cases of the desired signal, and the first canceller 520 cancels the desired signal from the demodulated reception signal by adding, to the adders, an estimated value $\hat{h}_1$ of a channel $h_1$ over which the desired signal is transmitted in the four constellation points $c_1$, $c_2$, $c_3$ and $c_4$. If the four adders equally receive the demodulated reception signal from the demodulator 510 and receive their associated channel estimated values $\hat{h}_1 c_1$, $\hat{h}_1 c_2$, $\hat{h}_1 c_3$ and $\hat{h}_1 c_4$, the four adders cancel the desired signal by subtracting the channel estimated values $\hat{h}_1 c_1$, $\hat{h}_1 c_2$, $\hat{h}_1 c_3$ and $\hat{h}_1 c_4$ from the demodulated reception signals. The desired signal-canceled reception signals are delivered to the first detector 530.

The first detector 530 includes a first amplifier 532 and a first signal decider 536, and the first amplifier 532 includes four multipliers. The four multipliers are connected to their associated adder of the first canceller 520 to receive outputs signals of their associated adder. If the multipliers receive desired signal-canceled reception signals from their associated adder of the first canceller 520 and receive a conjugate value $\hat{h}^*_2$ of an estimated value $\hat{h}_2$ of a channel $h_2$ over which the first interference signal is transmitted, the multipliers amplify the first interference signal in the desired signal-canceled reception signals by multiplying the reception signals by the conjugate value $\hat{h}^*_2$ of the channel estimated value $\hat{h}_2$. The first interference signal amplified in the desired signal-canceled reception signal is delivered to the first signal decider 536, and the first signal decider 536 detects the amplified first interference signal from the reception signal, and delivers it to the first regenerator 540. Herein, the first signal decider 536 has a structure in which its four deciders are connected to their associated multiplier of the first amplifier 532.

The first regenerator 540 includes four multipliers, and the four multipliers are connected to their associated decider in the first signal decider 536 of the first detector 530 to receive output signals of their associated decider in the first signal decider 536. That is, if the multipliers receive their associated first interference signal-detected reception signals (i.e. the reception signals from which the first interference signal is detected) from the first detector 530 and receive an estimated value $\hat{h}_2$ of a channel $h_2$ over which the first interference signal is transmitted, the multipliers each regenerate the first interference signal by multiplying the first interference signal-detected reception signals by the channel estimated value $\hat{h}_2$. The regenerated first interference signals $\hat{h}_2 d_{21}$, $\hat{h}_2 d_{22}$, $\hat{h}_2 d_{23}$ and $\hat{h}_2 d_{24}$ output from the four multipliers are delivered to the second canceller 550. Herein, $d_{21}$, $d_{22}$, $d_{23}$ and $d_{24}$ are estimated values of the first interference signals, obtained when the desired signal is transmitted in the constellation points $c_1$, $c_2$, $c_3$ and $c_4$.

The second canceller 550 includes four adders, and the four adders receive signals $\hat{h}_2 d_{21}$, $\hat{h}_2 d_{22}$, $\hat{h}_2 d_{23}$ and $\hat{h}_2 d_{24}$ output from their associated multiplier of the first regenerator 540 to cancel the first interference signal from the first interference signal-regenerated reception signals (i.e. the reception signals in which the first interference signal is regenerated). In addition, the four adders receive the desired signal-canceled reception signals output from their associated adder of the first canceller 520. If the four adders receive their associated first interference signal-regenerated reception signals $\hat{h}_2 d_{21}$, $\hat{h}_2 d_{22}$, $\hat{h}_2 d_{23}$ and $\hat{h}_2 d_{24}$ and desired signal-canceled reception signals, the four adders each cancel the first interference signal by subtracting the desired signal-canceled reception signals from the first interference signal-regenerated reception signals. The first interference signal-canceled reception signals are delivered to the second detector 560.

The second detector 560 includes a second amplifier 562 and a second signal decider 566, and the second amplifier 562 includes four multipliers. The four multipliers are connected to their associated adder of the second canceller 550 to receive outputs signals of their associated adder. That is, if the multipliers receive the first interference signal-canceled reception signals from their associated adder of the second canceller 550 and receive a conjugate value $\hat{h}^*_3$ of an estimated value $\hat{h}_3$ of a channel $h_3$ over which the second interference signal is transmitted, the multipliers amplify the second interference signal in the first interference signal-canceled reception signals by multiplying the first interference signal-canceled reception signals by the conjugate value $\hat{h}^*_3$ of the channel estimated value $\hat{h}_3$. The second interference signal amplified in the first interference signal-canceled reception signals is delivered to the second signal decider 566, and the second signal decider 566 detects the amplified second interference signal from the reception signal, and delivers the amplified second interference signal to the second regenerator 570. The second signal decider 566 has a structure in which its four deciders are connected to their associated multiplier of the second amplifier 562.

The second regenerator 570 includes four multipliers, and the four multipliers are connected to their associated decider in the second signal decider 566 of the second detector 560 to receive output signals of their associated deciders in the second signal decider 566. That is, the multipliers receive their associated second interference signal-detected reception signals (i.e. the reception signals from which the second interference signal is detected) from the second detector 560, and are connected to their associated decider in the second signal decider 566 for the estimated value $\hat{h}_3$ of the channel $h_3$ over which the second interference signal is transmitted, to receive output signals of their associated deciders in the second signal decider 566. That is, if the multipliers receive their associated second interference signal-detected reception signals from the second detector 560 and receive the estimated value $\hat{h}_3$ of the channel $h_3$ over which the second interference signal is transmitted, the multipliers each regenerate the second interference signal by multiplying the second interference signal-detected reception signals by the channel estimated value $h_3$. The regenerated second interference signals $\hat{h}_3 d_{31}$, $\hat{h}_3 d_{32}$, $\hat{h}_3 d_{33}$ and $\hat{h}_3 d_{34}$ output from the four multipliers are delivered to the third canceller 580. Herein, $d_{31}$, $d_{32}$, $d_{33}$ and $d_{34}$ are estimated values of the second interference signals, obtained when the desired signal is transmitted in the constellation points $c_1$, $c_2$, $c_3$ and $c_4$.

The third canceller 580 includes four adders, and the four adders receive signals $\hat{h}_3 d_{31}$, $\hat{h}_3 d_{32}$, $\hat{h}_3 d_{33}$ and $\hat{h}_3 d_{34}$ output from their associated multiplier of the second regenerator 570 to cancel the second interference signal from the second interference signal-regenerated reception signals (i.e. the reception signals in which the second interference signal is regenerated). In addition, the four adders receive the first interference signal-canceled reception signals output from associated adders of the second canceller 550. If the four adders receive their associated second interference signal-regenerated reception signals $\hat{h}_3 d_{31}$, $\hat{h}_3 d_{32}$, $\hat{h}_3 d_{33}$ and $\hat{h}_3 d_{34}$, and first interference signal-canceled reception signals, the four adders each cancel the second interference signal by subtracting the first interference signal-canceled reception signals from the second interference signal-regenerated reception signals. The reception signals from which the first interference signal, the second interference signal and the desired signal are cancelled, i.e. the output signals $y_1$, $y_2$, $y_3$ and $y_4$ of the four adders of the third canceller 580, are delivered to the calculator 590. The calculator 590 calculates LLRs of the reception signals from which the first interference signal, the second interference signal and the desired signal are cancelled, and delivers the LLRs to a decoder. A structure and LLR calculation of the calculator 590 will be described in detail below.

Even though the number of interference signals increases from 1 (in FIG. 4) to 2 (in FIG. 5) in this way, the receiver linearly increases in the number of detectors, regenerators and controllers, used for canceling the interference signals, thereby preventing a considerable increase in the system complexity and facilitating extension of the system according to the number of interference signals. A detailed description will now be made of the structure and LLR calculation process of the calculator 590.

The LLR can be expressed as Equation (3).

$$LLR(b_i) = \log\left(\frac{\exp(-|y_a|^2/2N_0) + \exp(-|y_b|^2/2N_0)}{\exp(-|y_c|^2/2N_0) + \exp(-|y_d|^2/2N_0)}\right) \quad (3)$$

$$= \log(\exp(-|y_a|^2/2N_0) + \exp(-|y_b|^2/2N_0)) -$$

$$\log(\exp(-|y_c|^2 2N_0) + \exp(-|y_d|^2/2N_0))$$

In Equation (3), $LLR(b_i)$ denotes an LLR of an $i^{th}$ bit, and $y_a$, $y_b$, $y_c$ and $y_d$ denote signals $y_1$, $y_2$, $y_3$ and $y_4$ being input to the calculator 590. In addition, $|y_a|^2$, $|y_b|^2$, $|y_c|^2$ and $|y_d|^2$ denote power of $y_a$, $y_b$, $y_c$ and $y_d$, respectively, and $N_0$ denotes power of noises included in the reception signal.

In order to simply express a logarithm term of Equation (3), a Jacobian logarithm function shown in Equation (4) can be used.

$$jacln(\delta_1, \delta_2) \square \ln(e^{\delta_1} + e^{\delta_2}) = \max(\delta_1, \delta_2) + \ln(1 + e^{-|\delta_2 - \delta_1|}) \quad (4)$$

$$= \max(\delta_1, \delta_2) + f_c(|\delta_2 - \delta_1|)$$

$$\approx \max(\delta_1, \delta_2)$$

Figure 6:
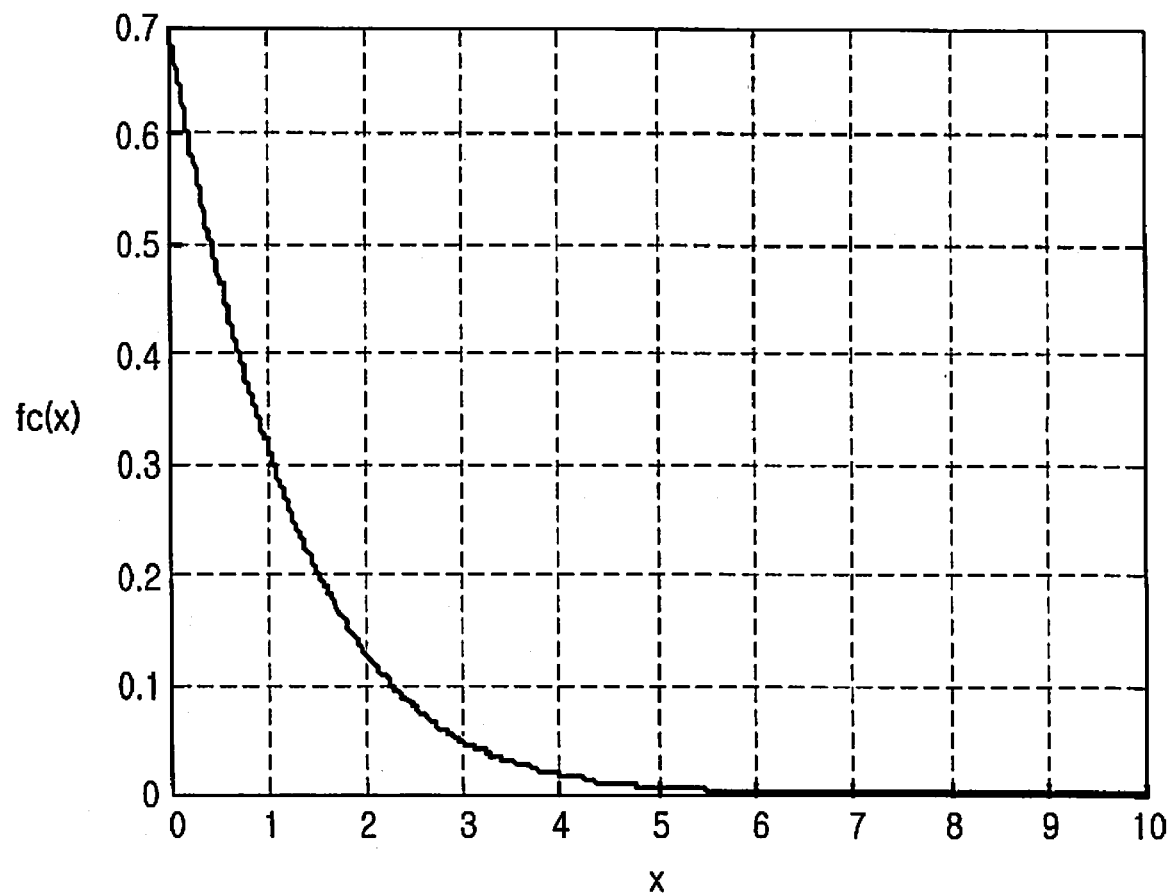
FIG. 6 is a diagram illustrating a correction function.

In Equation (4), $jacln(\delta_1, \delta_2)$ denotes a Jacobian logarithm function, $f(\bullet)$ denotes a correction function defined as shown in FIG. 6, and $\delta_1$ and $\delta_2$ denote variables $-|y_a|^2/2N_0$ and $-|y_b|^2/2N_0$ of an $\exp(\bullet)$ function in Equation (3), respectively. In this manner, $-|y_c|^2/2N_0$ and $-|y_d|^2/2N_0$ of Equation (3) can be can be denoted by $\delta_3$ and $\delta_4$, respectively.

Therefore, from Equation (4), the LLR defined in Equation (3) can be expressed as Equation (5).

$$LLR(b_i) = \log(\exp(-|y_a|^2/2N_0) + \exp(-|y_b|^2/2N_0)) - \quad (5)$$

$$\log(\exp(-|y_c|^2/2N_0) + \exp(-|y_d|^2/2N_0))$$

$$= \{\max(-|y_a|^2/2N_0, -|y_b|^2/2N_0) +$$

$$f_c(|-|y_a|^2/2N_0 + |y_b|^2/2N_0|)\} -$$

$$\{\max(-|y_c|^2/2N_0, -|y_d|^2/2N_0) +$$

$$f_c(|-|y_c|^2/2N_0 + |y_d|^2/2N_0|)\} \cong$$

$$\max(-|y_a|^2/2N_0, -|y_b|^2/2N_0) -$$

$$\max(-|y_c|^2/2N_0, -|y_d|^2/2N_0)$$

Figure 7A:
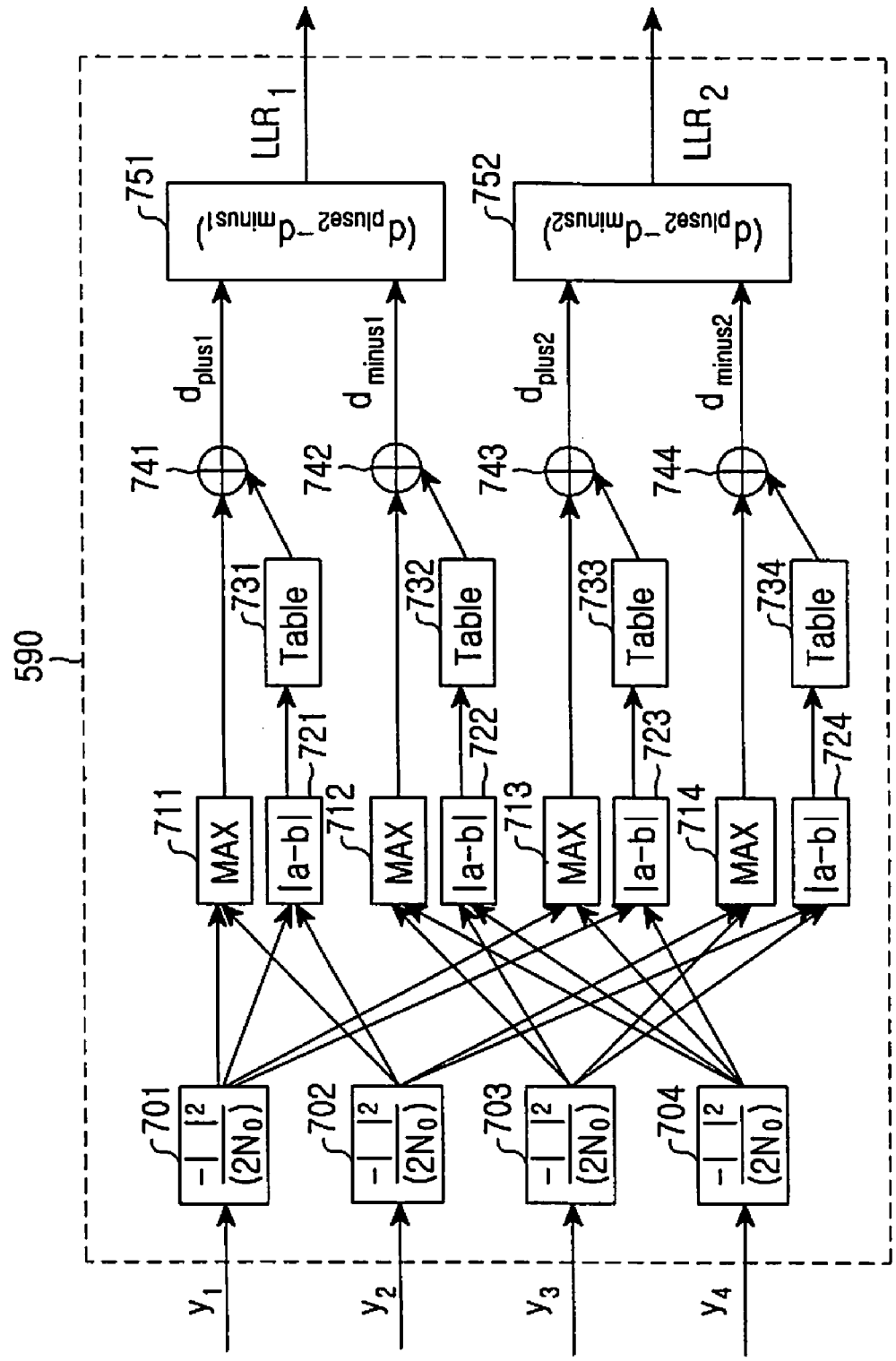
FIGS. 7A and 7B are diagrams illustrating a calculator structure of a receiver in a communication system according to the present invention.
Figure 7B:
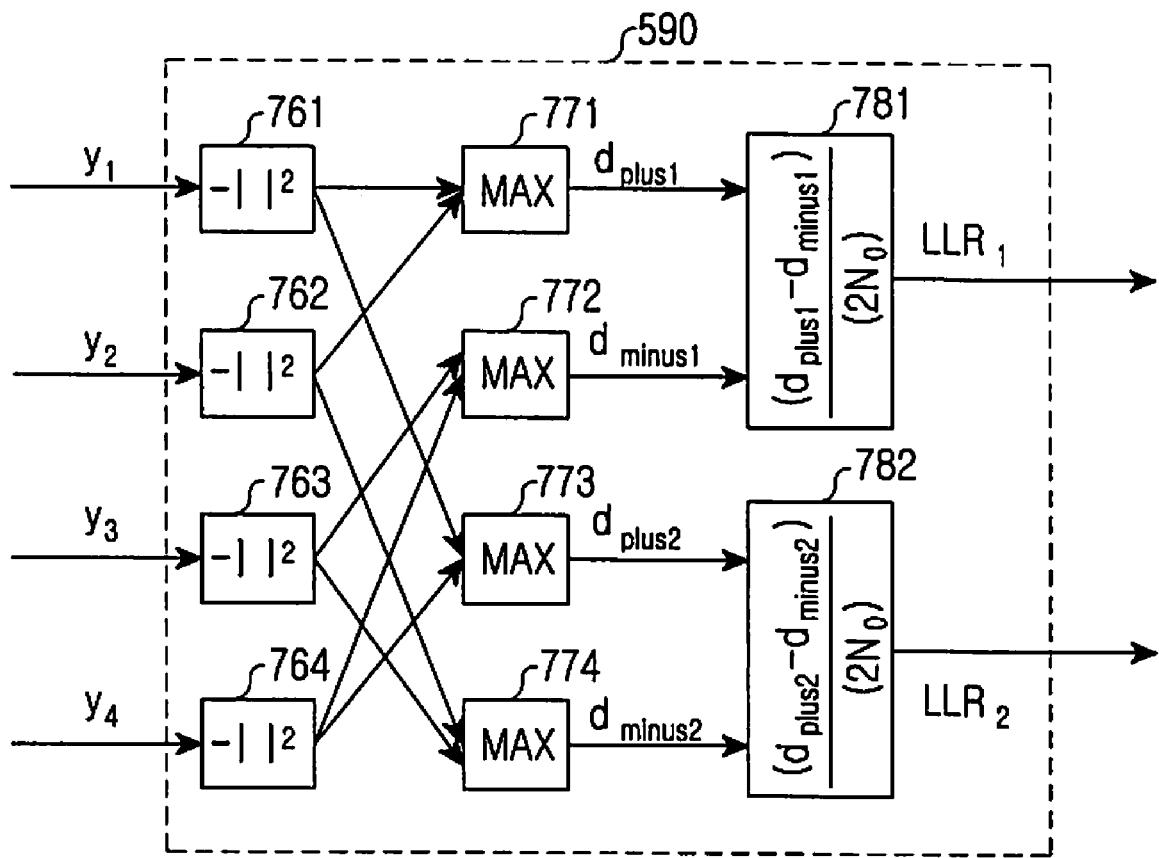

Using Equation (3), Equation (4) and Equation (5) defined in this way, the calculator 590 for calculating the LLR can be shown in FIGS. 7A and 7B. With reference to FIGS. 7A and 7B, a structure and LLR calculation process of the calculator 590 will now be described.

FIGS. 7A and 7B illustrate a calculator structure of a receiver in a communication system according to the present invention. Specifically, FIG. 7A illustrates a structure of the calculator 590 for $\max(\delta_1, \delta_2) + f_c(|\delta_2 - \delta_1|)$ in Equation (4), and FIG. 7B illustrates a structure of the calculator 590 for $\max(\delta_1, \delta_2)$ in Equation (4).

Referring to FIG. 7A, the calculator 590 includes power ratio calculators 701, 702, 703 and 704, maximum value calculators 711, 712, 713 and 714, subtractors 721, 722, 723 and 724, tables 731, 732, 733 and 734, adders 741, 742, 743 and 744, and LLR calculators 751 and 752.

The power ratio calculators 701, 702, 703 and 704 receive the reception signals $y_1$, $y_2$, $y_3$ and $y_4$ from which the first interference signal, the second interference signal and the desired signal are canceled, output from their associated four adders of the third canceller 580 in FIG. 5. The power ratio calculators 701, 702, 703 and 704 each calculate power ratios of the received signals $y_1$, $y_2$, $y_3$ and $y_4$ to noises. Specifically, the power ratio calculators 701, 702, 703 and 704 calculate variables $-|y_a|^2/2N_0$, $-|y_b|^2/2N_0$, $-|y_c|^2/2N_0$ and $-|y_d|^2/2N_0$ of the $\exp(\bullet)$ function in Equation (3), and calculate $\delta_1$, $\delta_2$, $\delta_3$ and $\delta_4$ in Equation (4), respectively.

The calculated $\delta_1$, $\delta_2$, $\delta_3$ and $\delta_4$ are delivered to the maximum value calculators 711, 712, 713 and 714, and the subtractors 721, 722, 723 and 724 according to interference between constellation points. The interference between constellation points is interference occurring between points located in adjacent quadrants in a constellation. Specifically, of $y_1$, $y_2$, $y_3$ and $y_4$ being input to the power ratio calculators 701, 702, 703 and 704, $y_1$ is transmitted in constellation points $c_1$ located in a first quadrant, $y_2$ is transmitted in constellation points $c_2$ located in a second quadrant, $y_3$ is transmitted in constellation points $c_3$ located in a third quadrant, and $y_4$ is transmitted in constellation points $c_4$ located in a fourth quadrant. Therefore, for the first quadrant, interference occurs between the second quadrant and the fourth quadrant. For the second quadrant, interference occurs between the first quadrant and the third quadrant. For the third quadrant, interference occurs between the second quadrant and the fourth quadrant. For the fourth quadrant, interference occurs between the first quadrant and the third quadrant.

The values $\delta_1$, $\delta_2$, $\delta_3$ and $\delta_4$ calculated in the power ratio calculators 701, 702, 703 and 704 are delivered to their associated maximum value calculators 711, 712, 713 and 714, and subtractors 721, 722, 723 and 724 according to the interferences between the constellation points. That is, $\delta_1$ and $\delta_2$ are input to the first maximum value calculator 711 and the first subtractor 721; $\delta_3$ and $\delta_4$ are input to the second maximum value calculator 712 and the second subtractor 722; $\delta_1$ and $\delta_4$ are input to the third maximum value calculator 713 and the third subtractor 723; and $\delta_2$ and $\delta_3$ are input to the fourth maximum value calculator 714 and the fourth subtractor 724.

The maximum value calculators 711, 712, 713 and 714, each receiving a pair of the input values, calculate maximum values of power ratios, which are the input value pairs, and deliver the calculated maximum values to the adders 741, 742, 743 and 744 connected thereto. Similarly, the subtractors 721, 722, 723 and 724, each receiving a pair of the input values, calculate difference values between the power ratios which are the input pair values, and deliver the calculated difference values to the tables 731, 732, 733 and 734 connected thereto.

The tables 731, 732, 733 and 734 calculate correction values by performing correction function calculation using the difference values received from their associated subtractors 721, 722, 723 and 724 as variables, and deliver the calculated correction values to the adders 741, 742, 743 and 744 connected thereto. That is, the adders 741, 742, 743 and 744 receive the calculated maximum values from their associated maximum value calculators 711, 712, 713 and 714, and the calculated correction values from their associated tables 731, 732, 733 and 734. Then the adders 741, 742, 743 and 744 calculate data components in reception signals received via a reception antenna by adding the maximum values and the correction values received in pairs, and deliver the calculated data components to their associated LLR calculators 751 and 752. As described above, for the QPSK modulation scheme of the transmitter, the constellation points each have 2 bits. Therefore, of the calculated data components $d_{plus1}$, $d_{minus1}$, $d_{plus2}$ and $d_{minus2}$, $d_{plus1}$ and $d_{minus1}$ mean data of the Most Significant Bit (MSB) among the 2 bits of the constellation points, and $d_{plus2}$ and $d_{minus2}$ mean data of the Least Significant Bit (LSB) among the 2 bits of the constellation points.

The LLR calculators 751 and 752, receiving $d_{plus1}$, $d_{minus1}$, $d_{plus2}$ and $d_{minus2}$, calculate LLRs and deliver the calculated LLRs to a decoder. In other words, the first LLR calculator 751, receiving $d_{plus1}$ and $d_{minus1}$, calculates an $LLR_1$ corresponding to the MSB of the data by subtracting $d_{minus1}$ from $d_{plus1}$, i.e. by calculating a difference between input values, and delivers the $LLR_1$ to the decoder. Similarly, the second LLR calculator 752, receiving $d_{plus2}$ and $d_{minus2}$, calculates an $LLR_2$ corresponding to the LSB of the data by subtracting $d_{minus2}$ from $d_{plus2}$, i.e. by calculating a difference between input values, and delivers the $LLR_2$ to the decoder. As a result, a 2-bit LLR is delivered to the decoder.

Referring to FIG. 7B, the calculator 590 includes power calculators 761, 762, 763 and 764, maximum value calculators 771, 772, 773 and 774, and LLR calculators 781 and 782.

The power calculators 761, 762, 763 and 764 receive the reception signals $y_1$, $y_2$, $y_3$ and $y_4$ from which the first interference signal, the second interference signal and the desired signal are canceled, output from their associated four adders of the third canceller 580 in FIG. 5. The power calculators 761, 762, 763 and 764 calculate powers of the input signals $y_1$, $y_2$, $y_3$ and $y_4$. Specifically, the power calculators 761, 762, 763 and 764 calculate $\delta_1$, $\delta_2$, $\delta_3$ and $\delta_4$ in Equation (4) by calculating variables $|y_a|^2$, $|y_b|^2$, $|y_c|^2$ and $|y_d|^2$ of the exp(•) function in Equation (3), respectively. Herein, $\delta_1$, $\delta_2$, $\delta_3$ and $\delta_4$ in Equation (4) are ratios of power of $|y_a|^2$, $|y_b|^2$, $|y_c|^2$ and $|y_d|^2$ to noise power $N_0$, respectively. However, because the LLR calculators 781 and 782 calculate LLRs as power ratios to the noise power $N_0$, the maximum value calculators 771, 772, 773 and 774 will receive approximate values for $\delta_1$, $\delta_2$, $\delta_3$ and $\delta_4$ in Equation (4).

The calculated $\delta_1$, $\delta_2$, $\delta_3$ and $\delta_4$ are delivered to the maximum value calculators 771, 772, 773 and 774 according to interference between constellation points. As described above, the interference between constellation points is interference occurring between points located in adjacent quadrants in a constellation. Specifically, of $y_1$, $y_2$, $y_3$ and $y_4$ being input to the power calculators 761, 762, 763 and 764, $y_1$ is transmitted in constellation points $c_1$ located in a first quadrant, $y_2$ is transmitted in constellation points $c_2$ located in a second quadrant, $y_3$ is transmitted in constellation points $c_3$ located in a third quadrant, and $y_4$ is transmitted in constellation points $c_4$ located in a fourth quadrant. Therefore, for the first quadrant, interference occurs between the second quadrant and the fourth quadrant. For the second quadrant, interference occurs between the first quadrant and the third quadrant. For the third quadrant, interference occurs between the second quadrant and the fourth quadrant. For the fourth quadrant, interference occurs between the first quadrant and the third quadrant.

The values $\delta_1$, $\delta_2$, $\delta_3$ and $\delta_4$ calculated in the power calculators 761, 762, 763 and 764 are delivered to their associated maximum value calculators 771, 772, 773 and 774 according to the interferences between the constellation points. That is, $\delta_1$ and $\delta_2$ are input to the first maximum value calculator 771; $\delta_3$ and $\delta_4$ are input to the second maximum value calculator 772; $\delta_1$ and $\delta_4$ are input to the third maximum value calculator 773; and $\delta_2$ and $\delta_3$ are input to the fourth maximum value calculator 774.

The maximum value calculators 771, 772, 773 and 774, each receiving a pair of the input values, calculate maximum values of powers, which are the input value pairs. The calculated maximum values can be approximated to data components in reception signals received via a reception antenna, and the calculated maximum values, i.e. data components, are delivered to the associated LLR calculators 781 and 782. As described above, for the QPSK modulation scheme of the transmitter, the constellation points each have 2 bits. Therefore, of the calculated data components $d_{plus1}$, $d_{minus1}$, $d_{plus2}$ and $d_{minus2}$, $d_{plus1}$ and $d_{minus1}$ are data of the MSB among the 2 bits of the constellation points, and $d_{plus2}$ and $d_{minus2}$ are data of the LSB among the 2 bits of the constellation points.

The LLR calculators 781 and 782, receiving $d_{plus1}$, $d_{minus1}$, $d_{plus2}$ and $d_{minus2}$, calculate LLRs and deliver the calculated LLRs to a decoder. In other words, the first LLR calculator 781, receiving $d_{plus1}$ and $d_{minus1}$, calculates an $LLR_1$ corresponding to the MSB of the data by subtracting $d_{minus1}$ from $d_{plus1}$, i.e. by calculating a difference between input values, and delivers the $LLR_1$ to the decoder. Similarly, the second LLR calculator 782, receiving $d_{plus2}$ and $d_{minus2}$, calculates an $LLR_2$ corresponding to the LSB of the data by subtracting $d_{minus2}$ from $d_{plus2}$, i.e. by calculating a difference between input values, and delivers the $LLR_2$ to the decoder. As a result, a 2-bit LLR is delivered to the decoder.

Figure 8:
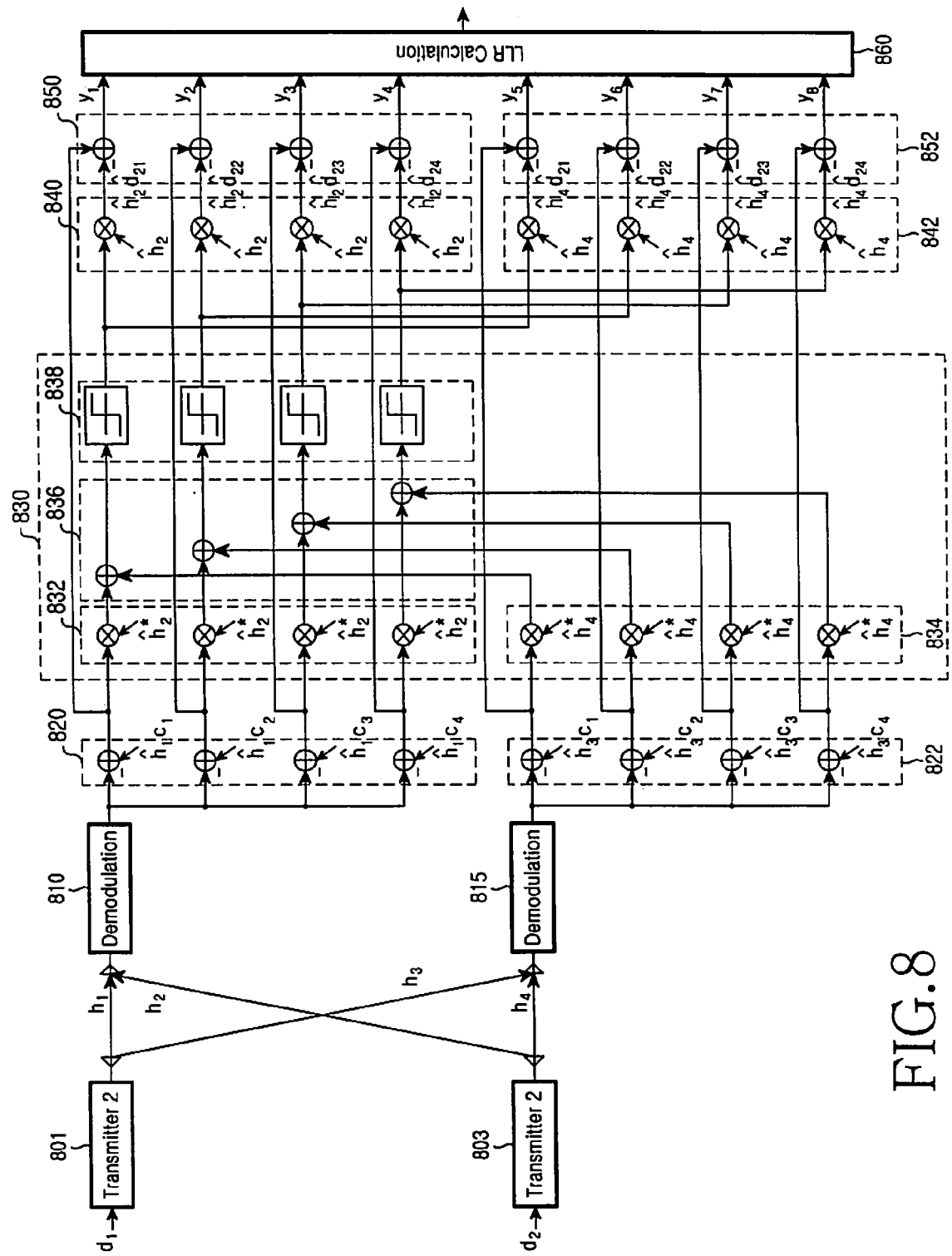
FIG. 8 is a diagram illustrating a structure of a receiver in a communication system according to the present invention.

FIG. 8 illustrates a structure of a receiver in a communication system according to the present invention. The receiver structure shown in FIG. 8 is provided for the case where a receiver receives signals transmitted by two transmitters via two reception antennas, i.e. two reception antennas receive one interference signal. Before a description of FIG. 8 is given, it should be noted that the receiver structure of FIG. 4, in which the number of reception antennas is 1, demodulates a reception signal received via a reception antenna, detects one interference signal by canceling a desired signal from the demodulated reception signal, regenerates the detected interference signal, cancels the regenerated signal, and then calculates an LLR.

The receiver structure shown in FIG. 8, in which the number of reception antennas is 2, parallel-performs the operation described with reference to FIG. 4, for the signals received via the reception antennas. The receiver demodulates reception signals received via the reception antennas, cancels desired signals from the demodulated reception signals, detects the same interference signals from the desired signal-canceled reception signals, regenerates the detected interference signals, and then cancels the interference signals. After canceling the interference signals, the receiver calculates an LLR. A detailed description thereof will now be made with reference to FIG. 8.

Referring to FIG. 8, the receiver includes first and second demodulators 810 and 812 for demodulating signals received via reception antennas using a scheme corresponding to a modulation scheme of a transmitter, first and second cancellers 820 and 822 for canceling, from the demodulated signal, desired signals that the receiver desires to receive, a detector 830 for detecting interference signals from the desired signal-canceled signals, first and second regenerators 840 and 842 for regenerating the detected interference signals, third and fourth cancellers 850 and 852 for canceling the regenerated interference signals from the desired signal-canceled signals, and a calculator 860 for calculating an LLR of the interference signal-canceled signals.

The receiver receives, via two reception antennas, the signals that two transmitters, i.e. a transmitter #1 801 and a transmitter #2 803, have transmitted through wireless channels $h_1$, $h_2$, $h_3$ and $h_4$, and delivers the received signals to the first and second demodulators 810 and 812 connected to their associated reception antennas. For convenience, it will be assumed herein that the transmitter #1 801 is a transmitter that exchanges data with the receiver, i.e. a transmitter that transmits a desired signal, and the transmitter #2 803 is a transmitter that transmits a signal serving as interference to the receiver, i.e. a transmitter that transmits interference signals. Accordingly, signals transmitted through $h_1$ and $h_3$ among the wireless channels $h_1$, $h_2$, $h_3$ and $h_4$ are desired signals, and signals transmitted through $h_2$ and $h_4$ are interference signals. In addition, it will be assumed that a modulation scheme of the transmitters 801 and 803, especially a modulation scheme of the transmitter #1 801, is QPSK.

The first and second demodulators 810 and 812, receiving reception signals from the reception antennas, demodulate the reception signals using a demodulation scheme corresponding to the QPSK modulation scheme of the transmitter #1 801 that exchanges data with the receiver itself, and deliver the demodulated reception signals to the first and second cancellers 820 and 822. The first demodulator 810 demodulates signals received from the reception antenna through $h_1$ and $h_2$ among the wireless channels $h_1$, $h_2$, $h_3$ and $h_4$, and delivers the demodulated reception signal to the first canceller 820 connected thereto. The second demodulator 812 demodulates signals received from the reception antenna through $h_3$ and $h_4$ among the wireless channels $h_1$, $h_2$, $h_3$ and $h_4$, and delivers the demodulated reception signal to the second canceller 822 connected thereto.

The first and second cancellers 820 and 822 each include four adders, and the four adders have a structure for canceling a desired signal taking into account all possible cases of the desired signal for the QPSK modulation scheme of the transmitter to cancel the desired signal from the demodulated reception signal. Because it is assumed that the modulation scheme of the transmitter is QPSK, the modulation scheme has four constellation points $c_1$, $c_2$, $c_3$ and $c_4$, thus the number of all possible cases of the desired signal is 4, and the four adders have a structure for canceling the desired signal taking the four cases into account.

More specifically, in the first canceller 820, the four adders have a branch structure taking into account the four possible cases of the desired signal transmitted through $h_1$ among the wireless channels $h_1$, $h_2$, $h_3$ and $h_4$, and the first canceller 820 cancels the desired signal from the demodulated reception signal by adding, to the adders, an estimated value $\hat{h}_1$ of a channel $h_1$ over which the desired signal is transmitted in the four constellation points $c_1$, $c_2$, $c_3$ and $c_4$. That is, if the four adders equally receive the demodulated reception signal from the first demodulator 810 and receive their associated channel estimated values $\hat{h}_1 c_1$, $\hat{h}_1 c_2$, $\hat{h}_1 c_3$ and $\hat{h}_1 c_4$, the four adders cancel the desired signal by subtracting the channel estimated values $\hat{h}_1 c_1$, $\hat{h}_1 c_2$, $\hat{h}_1 c_3$ and $\hat{h}_1 c_4$ from the demodulated reception signals. The desired signal-canceled reception signals are delivered to the detector 830.

Similarly, in the second canceller 822, the four adders have a branch structure taking into account the four possible cases of the desired signal transmitted through $h_3$ among the wireless channels $h_1$, $h_2$, $h_3$ and $h_4$, and the second canceller 822 cancels the desired signal from the demodulated reception signal by adding, to the adders, an estimated value $\hat{h}_3$ of a channel $h_3$ over which the desired signal is transmitted in the four constellation points $c_1$, $c_2$, $c_3$ and $c_4$. That is, if the four adders equally receive the demodulated reception signal from the second demodulator 812 and receive their associated channel estimated values $\hat{h}_3 c_1$, $\hat{h}_3 c_2$, $\hat{h}_3 c_3$ and $\hat{h}_3 c_4$, the four adders cancel the desired signal by subtracting the channel estimated values $\hat{h}_3 c_1$, $\hat{h}_3 c_2$, $\hat{h}_3 c_3$, $\hat{h}_3 c_4$ from the demodulated reception signals. The desired signal-canceled reception signals are delivered to the detector 830.

The detector 830 includes first and second amplifiers 832 and 834, an adder 836, and a signal decider 838. The first and second amplifiers 832 and 834 each have four multipliers. The first and second amplifiers 832 and 834 are connected to their associated first and second cancellers 820 and 822 to receive the desired signal-canceled reception signals output from the first and second cancellers 820 and 822. That is, the first amplifier 832 receives the signal output by the first canceller 820, and the second amplifier 834 receives the signal output by the second canceller 822.

More specifically, the four multipliers included in the first amplifier 832 are connected to their associated adder in the first canceller 820 to receive output signals of their associated adder. If the multipliers receive the desired signal-canceled reception signals from their associated adder of the first canceller 820 and receive a conjugate value $\hat{h}^*_2$ of an estimated value $\hat{h}_2$ of a channel $h_2$ over which the interference signal is transmitted, the multipliers amplify the interference signal in the desired signal-canceled reception signals by multiplying the desired signal-canceled reception signals by the conjugate value $\hat{h}^*_2$ of the channel estimated value $\hat{h}_2$. The interference signals amplified in the desired signal-canceled reception signals are delivered to the adder 836.

Similarly, the four multipliers included in the second amplifier 834 are connected to their associated adders in the second canceller 822 to receive output signals of their associated adder. If the multipliers receive the desired signal-canceled reception signals from their associated adder of the second canceller 822 and receive a conjugate value $\hat{h}^*_2$ of an estimated value $\hat{h}_4$ of a channel $h_4$ over which the interference signal is transmitted, the multipliers amplify the interference signal in the desired signal-canceled reception signals by multiplying the desired signal-canceled reception signals by the conjugate value $\hat{h}^*_4$ of the estimated value $\hat{h}_4$. The interference signals amplified in the desired signal-canceled reception signals are delivered to the adder 836.

The adder 836 includes four adder units, and the four adder units are connected to their associated multiplier of the first amplifier 832 and their associated multiplier of the second amplifier 834 to receive output signals of the first and second amplifiers 832 and 834 in pairs. As described above, the signals input to the four adder units make pairs according to the four constellation points $c_1$, $c_2$, $c_3$ and $c_4$. In other words, the output signals, corresponding to $c_1$ among the constellation points $c_1$, $c_2$, $c_3$ and $c_4$, of the first amplifier 832 and the second amplifier 834, make one pair, and the output signals corresponding to $c_2$ and the output signals corresponding to $c_3$ and $c_4$, of the first amplifier 832 and the second amplifier 834 and make other pairs. The signal pairs are input to the four adder units. Then the adder 836 adds the input signal pairs and delivers the results to the signal decider 838. The signal decider 838 detects the amplified interference signal from the reception signal, and delivers it to the first and second regenerators 840 and 842. Herein, the signal decider 838 has a structure in which its four deciders are connected to their associated four adder units of the adder 836.

The first and second regenerators 840 and 842 each include four adders, and the first and second regenerators 840 and 842 are both connected to the signal decider 838 of the detector 830 to receive output signals of the signal decider 838. As a result, the first and second regenerators 840 and 842 regenerate interference signals transmitted through $h_2$ and $h_4$ among the wireless channels $h_1$, $h_2$, $h_3$ and $h_4$, respectively.

More specifically, the first regenerator 840 includes four multipliers, and the four multipliers are connected to their associated decider in the signal decider 838 of the detector 830 to receive output signals of their associated decider in the signal decider 838. If the multipliers receive their associated reception signals from which an interference signal transmitted through $h_2$ is detected by the detector 830, and receive an estimated value $\hat{h}_2$ of a channel $h_2$ over which the interference signal is transmitted, the multipliers each regenerate the interference signal transmitted through $h_2$ by multiplying the interference signal-detected reception signals by the channel estimated value $\hat{h}_2$. The regenerated interference signals $\hat{h}_2 d_{21}$, $\hat{h}_2 d_{21}$, $\hat{h}_2 d_{22}$, $\hat{h}_2 d_{23}$ and $\hat{h}_2 d_{24}$ output from the four multipliers are delivered to the third canceller 850. Herein, $d_{21}$, $d_{22}$, $d_{23}$ and $d_{24}$ are estimated values of the interference signals, obtained when the desired signal is transmitted in the constellation points $c_1$, $c_2$, $c_3$ and $c_4$.

Similarly, the second regenerator 842 includes four multipliers, and the four multipliers are connected to their associated decider in the signal decider 838 of the detector 830 to receive output signals of their associated decider in the signal decider 838. That is, if the multipliers receive their associated reception signals from which the interference signal transmitted through $h_4$ is detected by the detector 830, and receive an estimated value $\hat{h}_4$ of a channel $h_4$ over which the interference signal is transmitted, the multipliers each regenerate the interference signal transmitted through $h_4$ by multiplying the interference signal-detected reception signals by the channel estimated value $\hat{h}_4$. The regenerated interference signals $\hat{h}_4 d_{21}$, $\hat{h}_4 d_{22}$, $\hat{h}_4 d_{23}$, and $\hat{h}_4 d_{24}$ output from the four multipliers are delivered to the fourth canceller 852.

The third and fourth cancellers 850 and 852 each include four adders, and the third and fourth cancellers 850 and 852 are connected to the first and second regenerators 840 and 842, respectively, to receive output signals of the first and second regenerators 840 and 842. As a result, the third and fourth cancellers 850 and 852 cancel the interference signals regenerated by the first and second regenerators 840 and 842, respectively.

More specifically, the third canceller 850 includes four adders, and the four adders receive the signals $\hat{h}_2 d_{21}$, $\hat{h}_2 d_{22}$, $\hat{h}_2 d_{23}$ and $\hat{h}_2 d_{24}$ output from their associated multiplier of the first regenerator 840 in order to cancel the interference signal from the reception signals in which the interference signal transmitted through $h_2$ among the wireless channels $h_1$, $h_2$, $h_3$ and $h_4$ is regenerated. In addition, the four adders receive the desired signal-canceled reception signals output from their associated adders of the first canceller 820. Upon receiving the interference signal-regenerated reception signals $\hat{h}_2 d_{21}$, $\hat{h}_2 d_{22}$, $\hat{h}_2 d_{23}$ and $\hat{h}_2 d_{24}$ and the desired signal-canceled reception signals, the four adders cancel the interference signal transmitted through $h_2$ by subtracting the desired signal-canceled reception signals from the interference signal-regenerated reception signals. The reception signals from which the interference signal transmitted through $h_2$ and the desired signal are canceled, i.e. output signals $y_1$, $y_2$, $y_3$ and $y_4$ of the four adders of the third canceller 850, are delivered to the calculator 860.

Similarly, the fourth canceller 852 includes four adders, and the four adders receive the signals $\hat{h}_4 d_{21}$, $\hat{h}_4 d_{22}$, $\hat{h}_4 d_{23}$ and $\hat{h}_4 d_{24}$ output from their associated multiplier of the second regenerator 842 in order to cancel the interference signal from the reception signals in which the interference signal transmitted through $h_2$ among the wireless channels $h_1$, $h_2$, $h_3$ and $h_4$ is regenerated. In addition, the four adders receive the desired signal-canceled reception signals output from their associated adder of the second canceller 822. Upon receiving the interference signal-regenerated reception signals $\hat{h}_4 d_{21}$, $\hat{h}_4 d_{22}$, $\hat{h}_4 d_{24}$ and the desired signal-canceled reception signals, the four adders cancel the interference signal transmitted through $h_4$ by subtracting the desired signal-canceled reception signals from the interference signal-regenerated reception signals. The reception signals from which the interference signal transmitted through $h_4$ and the desired signal are canceled, i.e. output signals $y_5$, $y_6$, $y_7$ and $y_8$ of the four adders of the fourth canceller 852, are delivered to the calculator 860. Then the calculator 860 calculates an LLR of the reception signals from which the interference signals transmitted through $h_2$ and $h_4$ among $h_1$, $h_2$, $h_3$ and $h_4$ and the desired signal are canceled, and deliver the calculated LLR to a decoder.

Figure 9A:
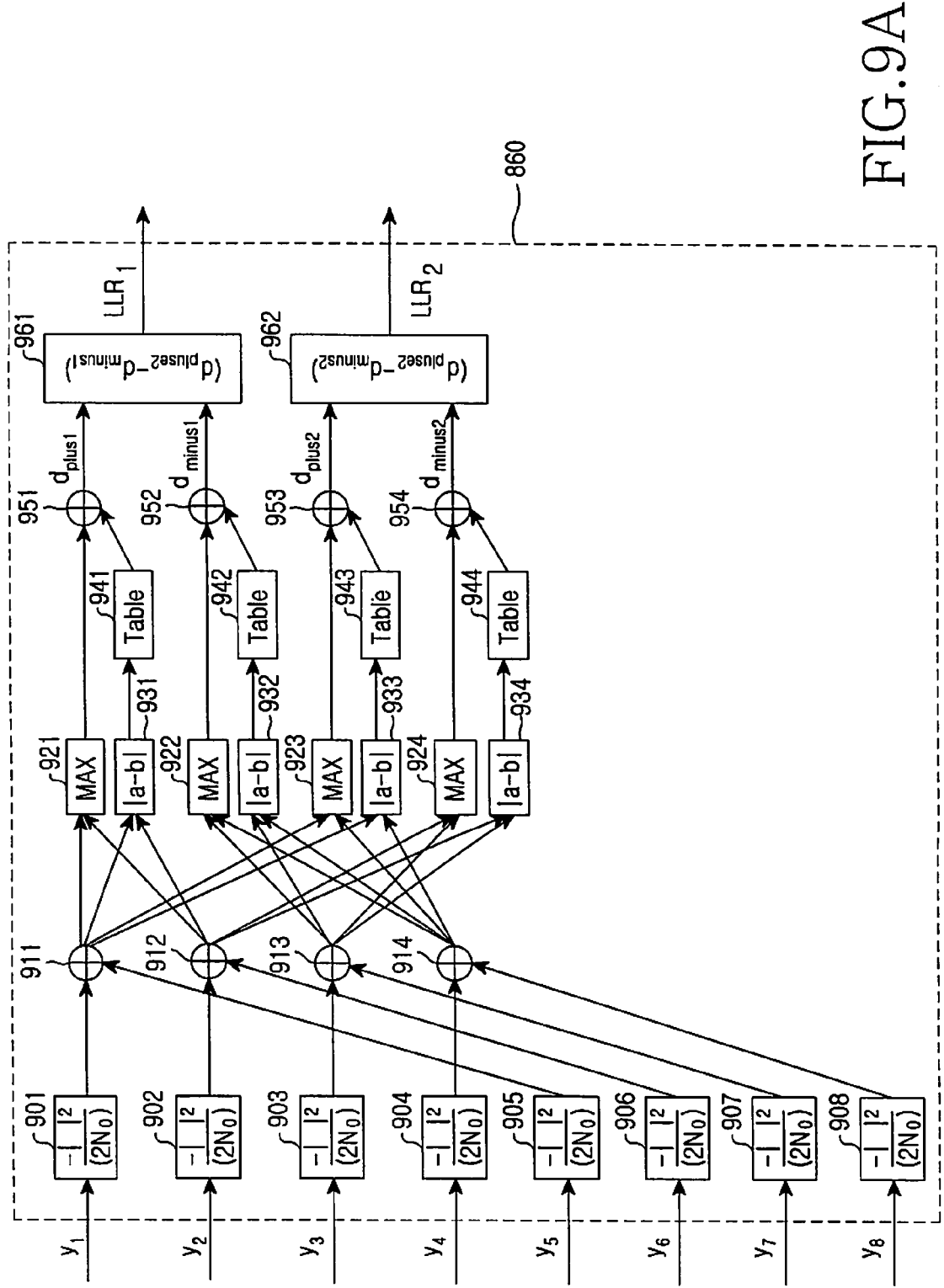
FIGS. 9A and 9B are diagrams illustrating a calculator structure of a receiver in a communication system according to the present invention.
Figure 9B:
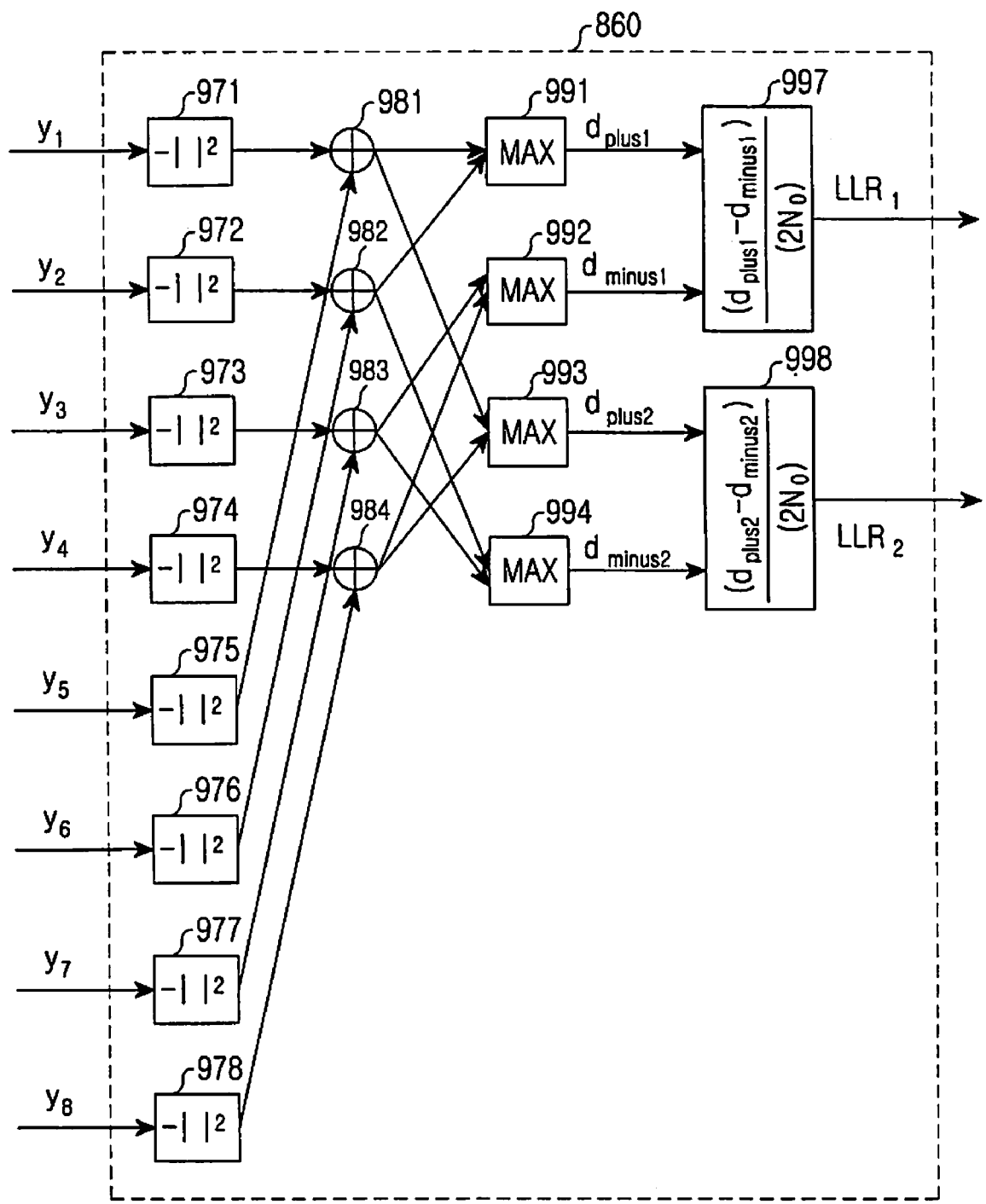

FIGS. 9A and 9B illustrate a calculator structure of a receiver in a communication system according to an embodiment of the present invention. Specifically, FIG. 9A illustrates a structure of the calculator 860 for $\max(\delta_1,\delta_2)+f_c(|\delta_2-\delta_1|)$ in Equation (4), and FIG. 9B illustrates a structure of the calculator 860 for $\max(\delta_1,\delta_2)$ in Equation (4).

Referring to FIG. 9A, the calculator 860 includes power ratio calculators 901, 902, 903, 904, 905, 906, 907 and 908, first adders 911, 912, 913 and 914, maximum value calculators 921, 922, 923 and 924, subtractors 931, 932, 933 and 934, tables 941, 942, 943 and 944, second adders 951, 952, 953 and 954, and LLR calculators 961 and 962.

The power ratio calculators 901, 902, 903, 904, 905, 906, 907 and 908 receive the reception signals $y_1$, $y_2$, $y_3$, $y_4$, $y_5$, $y_6$, $y_7$ and $y_8$ from which the interference signal and the desired signal are canceled, output from the four adders included in the third and fourth cancellers 850 and 852 in FIG. 8. The power ratio calculators 901, 902, 903, 904, 905, 906, 907 and 908 calculate power ratios of the input signals $y_1$, $y_2$, $y_3$, $y_4$, $y_5$, $y_6$, $y_7$ and $y_8$ to the noises. The calculated power ratios are delivered to the first adders 911, 912, 913 and 914.

The first adders 911, 912, 913 and 914 are connected to their associated power ratio calculator 901, 902, 903, 904, 905, 906, 907 and 908 in pairs, and receive the calculated power ratios from the power ratio calculators 901, 902, 903, 904, 905, 906, 907 and 908 connected in pairs. As described above, the power ratio pairs input to the first adders 911, 912, 913 and 914 make pairs according to the four constellation points $c_1$, $c_2$, $c_3$ and $c_4$. In other words, the power ratios calculated by the first power ratio calculator 901 and the fifth power ratio calculator 905, corresponding to $c_1$ among the constellation points $c_1$, $c_2$, $c_3$ and $c_4$, make one pair. Similarly, the power ratios calculated by the second power ratio calculator 902 and the sixth power ratio calculator 906, corresponding to $c_2$, make one pair. The power ratios calculated by the third power ratio calculator 903 and the seventh power ratio calculator 907, corresponding to $c_3$, make one pair. The power ratios calculated by the fourth power ratio calculator 904 and the eighth power ratio calculator 908, corresponding to $c_4$, make one pair. The power ratio pairs are input to their associated first adders 911, 912, 913 and 914. Then the first adders 911, 912, 913 and 914 add the input power ratio pairs, and deliver the results to the maximum value calculators 921, 922, 923 and 924, and the subtractors 931, 932, 933 and 934.

Through the process in which the power ratio calculators 901, 902, 903, 904, 905, 906, 907 and 908 calculate power ratios of the signals $y_1$, $y_2$, $y_3$, $y_4$, $y_5$, $y_6$, $y_7$ and $y_8$ received from the third and fourth cancellers 850 and 852, to the noises, and then the first adders 911, 912, 913 and 914 add the pairs of the calculated power ratios, the first adders 911, 912, 913 and 914 calculate variables $-|y_a|^2/2N_0$, $-|y_b|^2/2N_0$, $-|y_c|^2/2N_0$ and $-|y_d|^2/2N_0$, of the exp(•) function in Equation (3), and calculate $\delta_1$, $\delta_2$, $\delta_3$ and $\delta_4$ in Equation (4), respectively.

The calculated $\delta_1$, $\delta_2$, $\delta_3$ and $\delta_4$ are delivered to the maximum value calculators 921, 922, 923 and 924, and the subtractors 931, 932, 933 and 934 according to interference between constellation points. The interference between constellation points means interference occurring between points located in adjacent quadrants in a constellation. Specifically, of $y_1$, $y_2$, $y_3$, $y_4$, $y_5$, $y_6$, $y_7$ and $y_8$ being input to the power ratio calculators 901, 902, 903, 904, 905, 906, 907 and 908, $y_1$ and $y_5$ are transmitted in constellation points $c_1$ located in the first quadrant, $y_2$ and $y_6$ are transmitted in constellation points $c_2$ located in the second quadrant, $y_3$ and $y_7$ are transmitted in constellation points $c_3$ located in the third quadrant, and $y_4$ and $y_8$ are transmitted in constellation points $c_4$ located in the fourth quadrant. Therefore, for the first quadrant, interference occurs between the second quadrant and the fourth quadrant. For the second quadrant, interference occurs between the first quadrant and the third quadrant. For the third quadrant, interference occurs between the second quadrant and the fourth quadrant. For the fourth quadrant, interference occurs between the first quadrant and the third quadrant.

The values $\delta_1$, $\delta_2$, $\delta_3$ and $\delta_4$ calculated by the power ratio calculators 901, 902, 903, 904, 905, 906, 907 and 908, and the first adders 911, 912, 913 and 914 are delivered to their associated maximum value calculator 921, 922, 923 and 924, and subtractor 931, 932, 933 and 934 according to the interferences between the constellation points. That is, $\delta_1$ and $\delta_2$ are input to the first maximum value calculator 921 and the first subtractor 931; $\delta_3$ and $\delta_4$ are input to the second maximum value calculator 922 and the second subtractor 932; $\delta_1$ and $\delta_4$ are input to the third maximum value calculator 923 and the third subtractor 933; and $\delta_2$ and $\delta_3$ are input to the fourth maximum value calculator 924 and the fourth subtractor 934.

The maximum value calculators 921, 922, 923 and 924, each receiving a pair of the input values, calculate maximum values of power ratios which are the input value pairs. The calculated maximum values are delivered to the second adders 951, 952, 953 and 954 connected to their associated maximum value calculator 921, 922, 923 and 924. In addition, the subtractors 931, 932, 933 and 934, each receiving a pair of input values, calculate difference values between the input power ratio pairs, and deliver the calculated difference values to the tables 941, 942, 943 and 944 connected thereto.

The tables 941, 942, 943 and 944 calculate correction values by performing correction function calculation using the difference values received from their associated subtractors 931, 932, 933 and 934 as variables, and deliver the calculated correction values to the second adders 951, 952, 953 and 954 connected thereto. That is, the second adders 951, 952, 953 and 954 receive the maximum values calculated by the maximum value calculators 921, 922, 923 and 924, and the correction values calculated by the tables 941, 942, 943 and 944. Then the second adders 951, 952, 953 and 954 calculate data components in reception signals received via a reception antenna by adding the maximum values and the correction values received in pairs, and deliver the calculated data components to their associated LLR calculators 961 and 962. As described above, for the QPSK modulation scheme of the transmitter, the constellation points each have 2 bits. Therefore, of the calculated data components $d_{plus1}$, $d_{minus1}$, $d_{plus2}$ and $d_{minus2}$, $d_{plus1}$ and $d_{minus1}$ are data of the MSB among the 2 bits of the constellation points, and $d_{plus2}$ and $d_{minus2}$ are data of the LSB among the 2 bits of the constellation points.

The LLR calculators 961 and 962, receiving $d_{plus1}$, $d_{minus1}$, $d_{plus2}$ and $d_{minus2}$, calculate LLRs and deliver the calculated LLRs to a decoder. In other words, the first LLR calculator 961, receiving $d_{plus1}$ and $d_{minus1}$, calculates an $LLR_1$ corresponding to the MSB of the data by subtracting $d_{minus1}$ from $d_{plus1}$, i.e. by calculating a difference between input values, and delivers the $LLR_1$ to the decoder. Similarly, the second LLR calculator 962, receiving $d_{plus2}$ and $d_{minus2}$, calculates an $LLR_2$ corresponding to the LSB of the data by subtracting $d_{minus2}$ from $d_{plus2}$, i.e. by calculating a difference between input values, and delivers the $LLR_2$ to the decoder. As a result, a 2-bit LLR is delivered to the decoder.

Referring to FIG. 9B, the calculator 860 includes power calculators 971, 972, 973, 974, 975, 976, 977 and 978, adders 981, 982, 983 and 984, maximum value calculators 991, 992, 993 and 994, and LLR calculators 997 and 998.

The power calculators 971, 972, 973, 974, 975, 976, 977 and 978 receive the reception signals $y_1$, $y_2$, $y_3$, $y_4$, $y_5$, $y_6$, $y_7$ and $y_8$ from which the interference signal and the desired signal are canceled, output from the four adders included in the third and fourth cancellers 850 and 852 in FIG. 8. The power calculators 971, 972, 973, 974, 975, 976, 977 and 978 calculate powers of the input signals $y_1$, $y_2$, $y_3$, $y_4$, $y_5$, $y_6$, $y_7$ and $y_8$. The calculated powers are delivered to the adders 981, 982, 983 and 984.

The adders 981, 982, 983 and 984 are connected to their associated power calculator 971, 972, 973, 974, 975, 976, 977 and 978 in pairs, and receive the calculated powers from the power calculators 971, 972, 973, 974, 975, 976, 977 and 978 connected in pairs. As described above, the power pairs input to the adders 981, 982, 983 and 984 make pairs according to the four constellation points $c_1$, $c_2$, $c_3$ and $c_4$.

The powers calculated by the first power calculator 971 and, the fifth power calculator 975, corresponding to $c_1$ among the constellation points $c_1$, $c_2$, $c_3$ and $c_4$, make one pair. Similarly, the powers calculated by the second power calculator 972 and the sixth power calculator 976, corresponding to $c_2$, make one pair. The powers calculated by the third power calculator 973 and the seventh power calculator 977, corresponding to $c_3$, make one pair. The powers calculated by the fourth power calculator 974 and the eighth power calculator 978, corresponding to $c_4$, make one pair. The power pairs are input to their associated adders 981, 982, 983 and 984. Then the adders 981, 982, 983 and 984 add the input power pairs, and deliver the results to the maximum value calculators 991, 992, 993 and 994.

Through the process in which the power calculators 971, 972, 973, 974, 975, 976, 977 and 978 calculate powers of the signals $y_1, y_2, y_3, y_4, y_5, y_6, y_7$ and $y_8$ received from the third and fourth cancellers 850 and 852, and then the adders 981, 982, 983 and 984 add the calculated power pairs, the adders 981, 982, 983 and 984 calculate variables $-|y_a|^2/2N_0, -|y_b|^2/2N_0, -|y_c|^2/2N_0$ and $-|y_d|^2/2N_0$ of the exp(•) function in Equation (3), and calculate $\delta_1, \delta_2, \delta_3$ and $\delta_4$ in Equation (4), respectively.

The calculated $\delta_1, \delta_2, \delta_3, \delta_4$ are delivered to the maximum value calculators 991, 992, 993 and 994 according to interference between constellation points. The interference between constellation points means interference occurring between points located in adjacent quadrants in a constellation. Specifically, of $y_1, y_2, y_3, y_4, y_5, y_6, y_7$ and $y_8$ being input to the power calculators 971, 972, 973, 974, 975, 976, 977 and 978, $y_1$ and $y_5$ are transmitted in constellation points $c_1$ located in the first quadrant, $y_2$ and $y_6$ are transmitted in constellation points $c_2$ located in the second quadrant, $y_3$ and $y_7$ are transmitted in constellation points $c_3$ located in the third quadrant, and $y_4$ and $y_8$ are transmitted in constellation points $c_4$ located in the fourth quadrant. Therefore, for the first quadrant, interference occurs between the second quadrant and the fourth quadrant. For the second quadrant, interference occurs between the first quadrant and the third quadrant. For the third quadrant, interference occurs between the second quadrant and the fourth quadrant. For the fourth quadrant, interference occurs between the first quadrant and the third quadrant.

The values $\delta_1, \delta_2, \delta_3$ and $\delta_4$ calculated by power calculators 971, 972, 973, 974, 975, 976, 977 and 978, and the adders 981, 982, 983 and 984 are delivered to their associated maximum value calculator 991, 992, 993 and 994 according to the interferences between the constellation points. That is, $\delta_1$ and $\delta_2$ are input to the first maximum value calculator 991; $\delta_3$ and $\delta_4$ are input to the second maximum value calculator 992; $\delta_1$ and $\delta_4$ are input to the third maximum value calculator 993; and $\delta_2$ and $\delta_3$ are input to the fourth maximum value calculator 994.

The maximum value calculators 991, 992, 993 and 994, each receiving a pair of the input values, calculate maximum values of powers which are the input value pairs. The calculated maximum values can be approximated to data components in reception signals received via a reception antenna, and the calculated maximum values, i.e. data components, are delivered to their associated LLR calculators 997 and 998. As described above, for the QPSK modulation scheme of the transmitter, the constellation points each have 2 bits. Therefore, of the calculated data components $d_{plus1}, d_{minus1}, d_{plus2}$ and $d_{minus2}$, $d_{plus1}$ and $d_{minus1}$ mean data of the MSB among the 2 bits of the constellation points, and $d_{plus2}$ and $d_{minus2}$ mean data of the LSB among the 2 bits of the constellation points.

The LLR calculators 997 and 998, receiving $d_{plus1}, d_{minus1}, d_{plus2}$ and $d_{minus2}$, calculate LLRs and deliver the calculated LLRs to a decoder. In other words; the first LLR calculator 997, receiving $d_{plus1}$ and $d_{minus1}$, calculates an $LLR_1$ corresponding to the MSB of the data by subtracting $d_{minus1}$ from $d_{plus1}$, i.e. by calculating a difference between input values, and delivers the $LLR_1$ to the decoder. Similarly, the second LLR calculator 998, receiving $d_{plus2}$ and $d_{minus2}$, calculates an $LLR_2$ corresponding to the LSB of the data by subtracting $d_{minus2}$ from $d_{plus2}$, i.e. by calculating a difference between input values, and delivers the $LLR_2$ to the decoder. As a result, a 2-bit LLR is delivered to the decoder.

As can be understood from the foregoing description, the communication system according to the present invention cancels a desired signal from a reception signal received via a reception antenna and then cancels an interference signal from the desired signal-canceled reception signal before receiving data, thereby facilitating interference cancellation. As a result, the present invention contributes to a reduction in the system complexity and an increase in the reception performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for receiving data in a communication system, the method comprising:
   receiving a first signal from a transmitter, canceling from the first signal a second signal desired to be received from the transmitter; and
   detecting and canceling an interference signal from the second signal-canceled first signal, calculating a Log Likelihood Ratio (LLR) of the interference signal-canceled first signal, and decoding the LLR,
   wherein the second signal is calculated in each constellation point determined according to a modulation scheme of the transmitter,
   wherein the LLR calculation comprises calculating a power ratio of the interference signal-canceled first signal to a noise included in the first signal, calculating a maximum value of the calculated power ratio, and calculating an LLR of the calculated maximum value, and
   wherein the power ratio calculation comprises calculating power ratios in constellation points determined according to the modulation scheme of the transmitter, and calculating a power ratio at a point in a first constellation quadrant, a power ratio at a point in a second constellation quadrant, a power ratio at a point in a third constellation quadrant, and a power ratio at a point in a fourth constellation quadrant.

2. The method of claim 1, wherein the maximum value calculation comprises calculating a maximum value of the calculated power ratio based on interference levels between the constellation points.

3. The method of claim 1, wherein the LLR calculation of the calculated maximum value comprises calculating a difference between maximum values of the power ratios calculated at the constellation points.

4. The method of claim 3, wherein the difference calculation comprises calculating a difference between a maximum value of the power ratios calculated at the points in the first constellation quadrant and the second constellation quadrant, and a maximum value of the power ratios calculated at the points in the third constellation quadrant and the fourth constellation quadrant.

5. The method of claim 1, wherein the second signal cancellation comprises subtracting, from the received first signal, an estimated value of a channel, over which the second signal is transmitted, at constellation points determined according to the modulation scheme of the transmitter.

6. The method of claim 1, wherein the interference signal detection comprises multiplying the second signal-canceled first signal by a conjugate value of an estimated value of a channel over which the interference signal is transmitted.

7. The method of claim 1, wherein the interference signal detection and cancellation comprises regenerating the detected interference signal, and canceling the regenerated interference signal.

8. The method of claim 7, wherein the regeneration comprises multiplying the second signal-canceled first signal by an estimated value of a channel over which the detected interference signal is transmitted.

9. The method of claim 1, wherein the interference signal detection and cancellation comprises subtracting an estimated value of the interference signal from the second signal-canceled first signal when the second signal is transmitted at constellation points determined according to the modulation scheme of the transmitter.

10. The method of claim 1, wherein the interference signal detection and cancellation comprises:
if there are multiple interference signals, detecting and canceling an interference signal having a greater Signal-to-Interference and Noise Ratio (SINK) among the interference signals.

11. An apparatus for receiving data in a communication system, the apparatus comprising:
a first canceller for, receiving a first signal from a transmitter, canceling from the first signal a second signal desired to be received from the transmitter;
a second canceller for detecting and canceling an interference signal from the second signal-canceled first signal; and
a calculator for calculating a Log Likelihood Ratio (LLR) of the interference signal-canceled first signal,
wherein the second signal is calculated in each constellation point determined according to a modulation scheme of the transmitter, and
wherein the calculator calculates a power ratio of the interference signal-canceled first signal to a noise included in the first signal, calculates a maximum value of the calculated power ratio, and calculates an LLR of the calculated maximum value, calculates power ratios in constellation points based on the modulation scheme of the transmitter, and calculates a power ratio at a point in a first constellation quadrant, a power ratio at a point in a second constellation quadrant, a power ratio at a point in a third constellation quadrant, and a power ratio at a point in a fourth constellation quadrant.

12. The apparatus of claim 11, wherein the calculator calculates a maximum value of the calculated power ratio based on interference between the constellation points.

13. The apparatus of claim 11, wherein the calculator calculates the LLR of the calculated maximum value by calculating a difference between maximum values of the power ratios calculated at the constellation points.

14. The apparatus of claim 13, wherein the calculator calculates the LLR of the calculated maximum value by calculating a difference between a maximum value of the power ratios calculated at the points of the first constellation quadrant and the second constellation quadrant, and a maximum value of the power ratios calculated at the points of the third constellation quadrant and the fourth constellation quadrant.

15. The apparatus of claim 11, wherein the first canceller subtracts, from the received first signal, an estimated value of a channel over which the second signal is transmitted at constellation points determined according to the modulation scheme of the transmitter.

16. The apparatus of claim 11, wherein the second canceller detects the interference signal by multiplying the second signal-canceled first signal by a conjugate value of an estimated value of a channel over which the interference signal is transmitted.

17. The apparatus of claim 11, wherein the second canceller comprises a regenerator for regenerating the detected interference signal.

18. The apparatus of claim 17, wherein the regenerator generates the detected interference signal by multiplying the second signal-canceled first signal by an estimated value of a channel over which the detected interference signal is transmitted.

19. The apparatus of claim 11, wherein the second canceller subtracts an estimated value of the interference signal from the second signal-canceled first signal when the second signal is transmitted at constellation points determined based on the modulation scheme of the transmitter.

20. The apparatus of claim 11, wherein if there are multiple interference signals, the second canceller detects and cancels an interference signal having a greater Signal-to-Interference and Noise Ratio (SINR) among the interference signals.

* * * * *